Oct. 17, 1961 G. E. FLINN 3,004,446
TRANSMISSION CONTROLS
Filed May 25, 1956 6 Sheets-Sheet 1
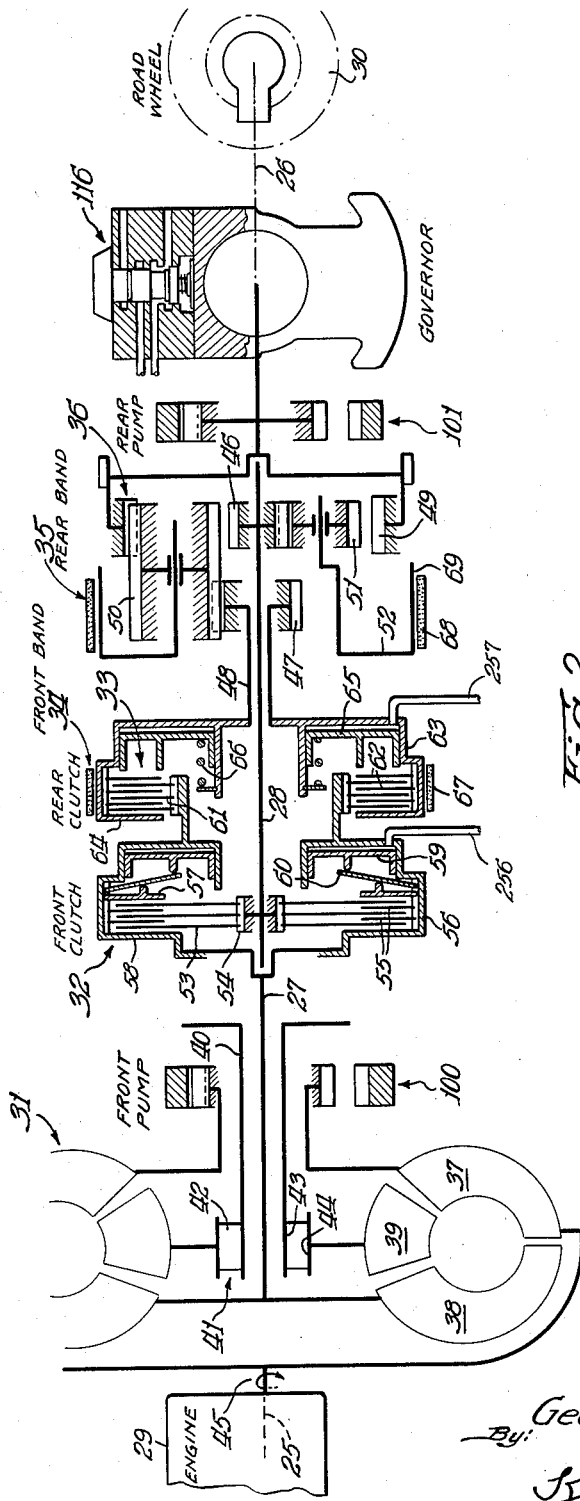
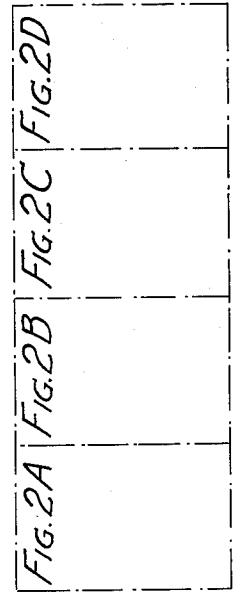
Inventor:
George E. Flinn
By: Keith T. Blewer Atty.

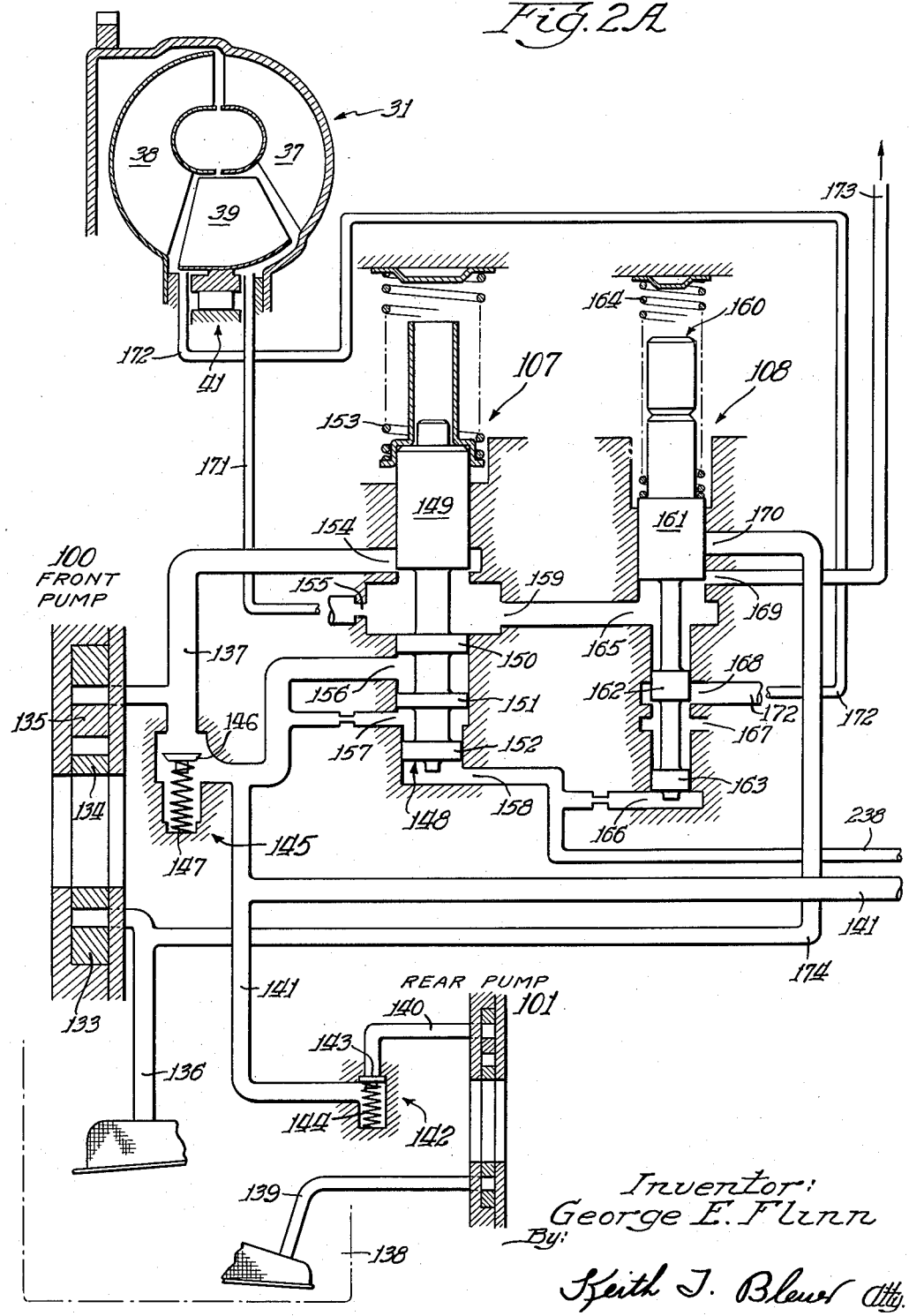

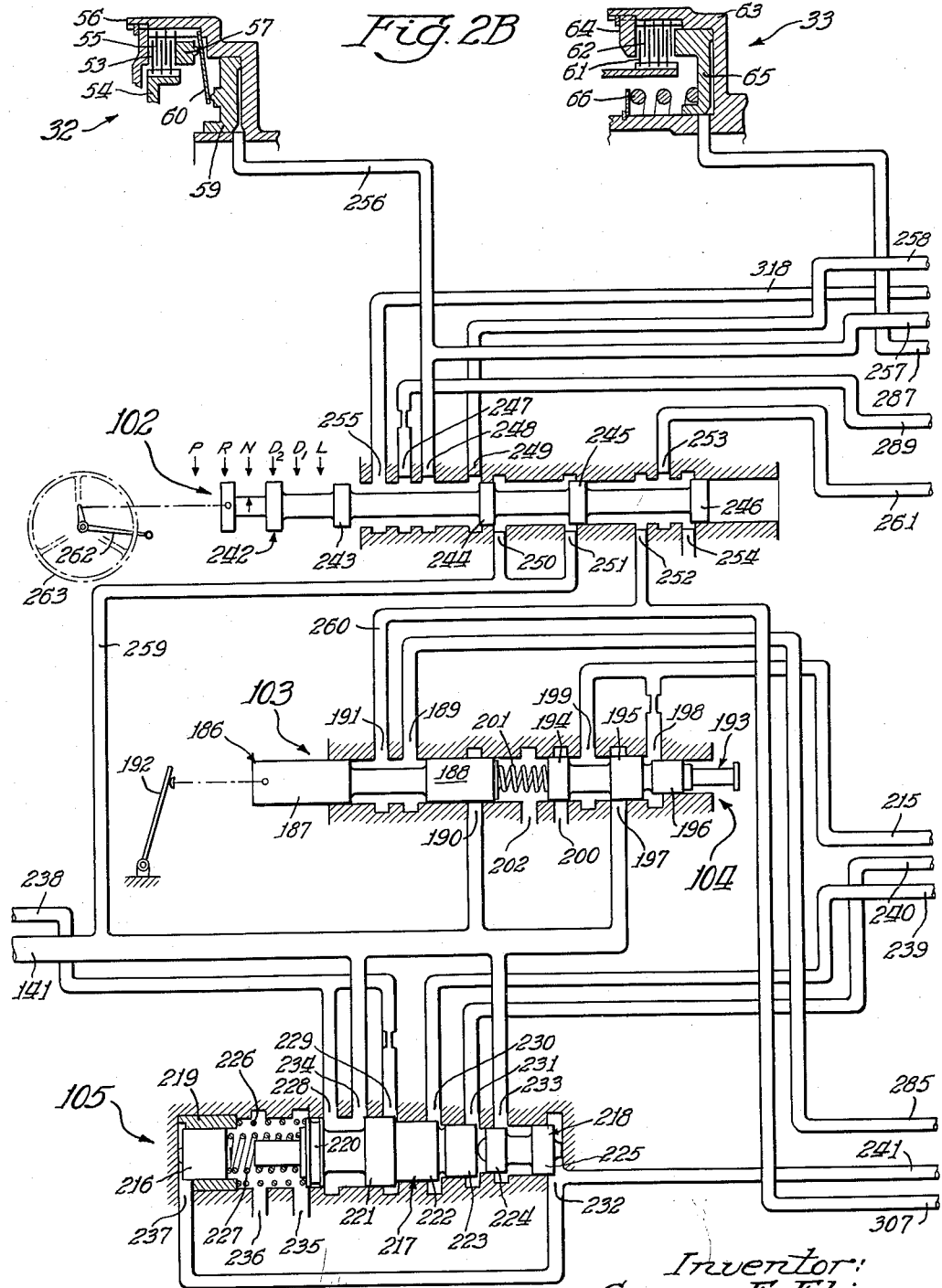

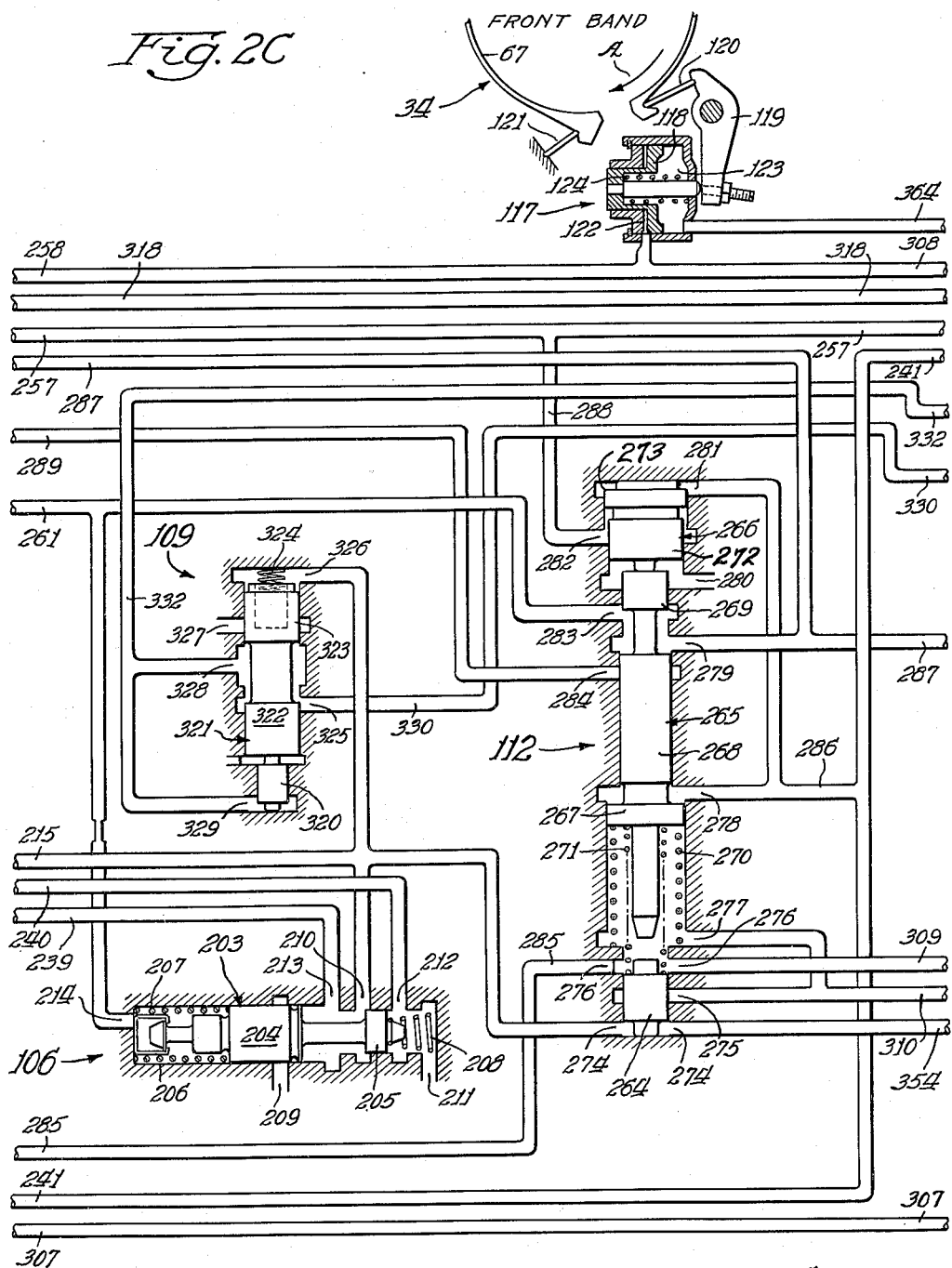

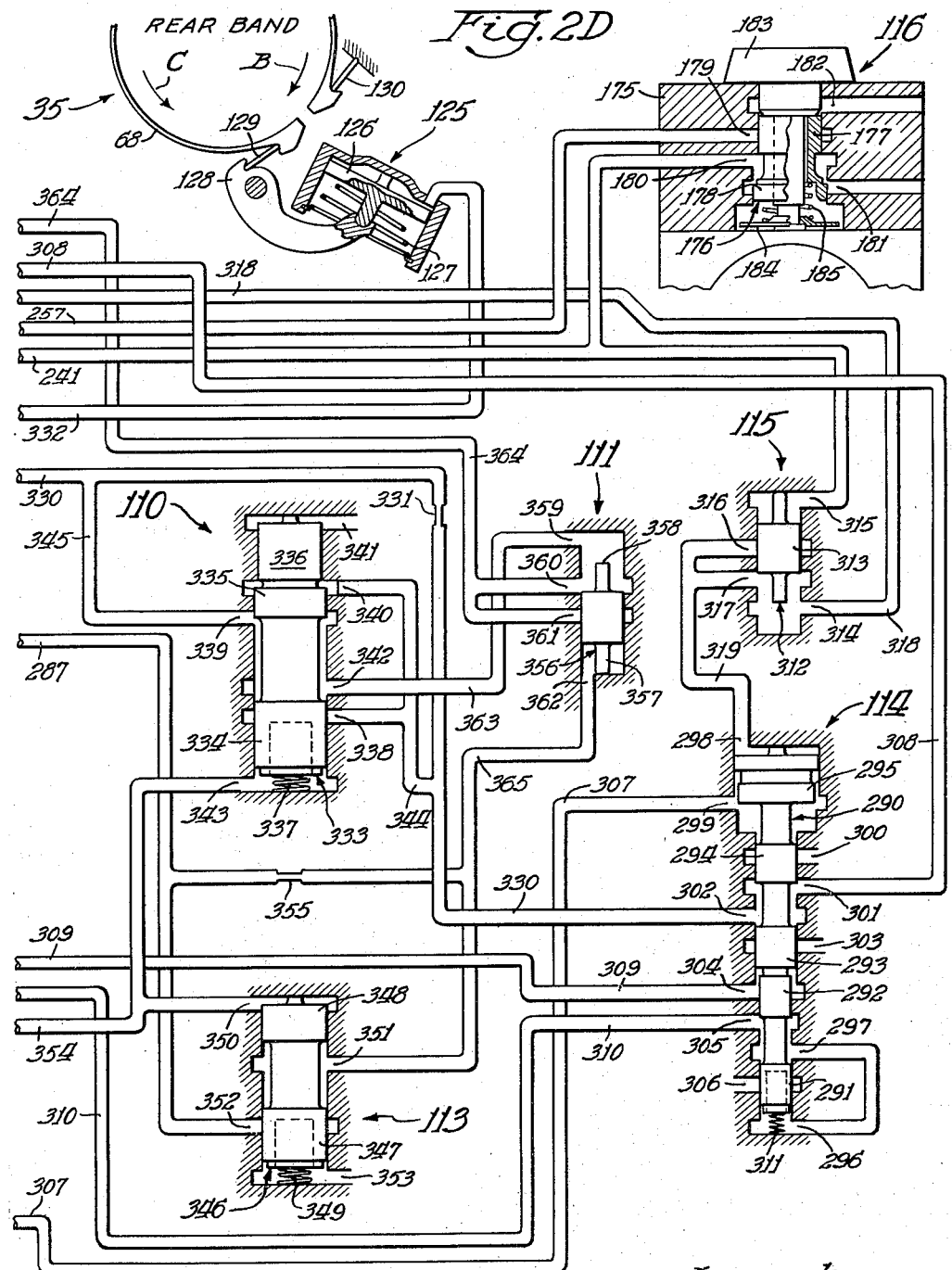

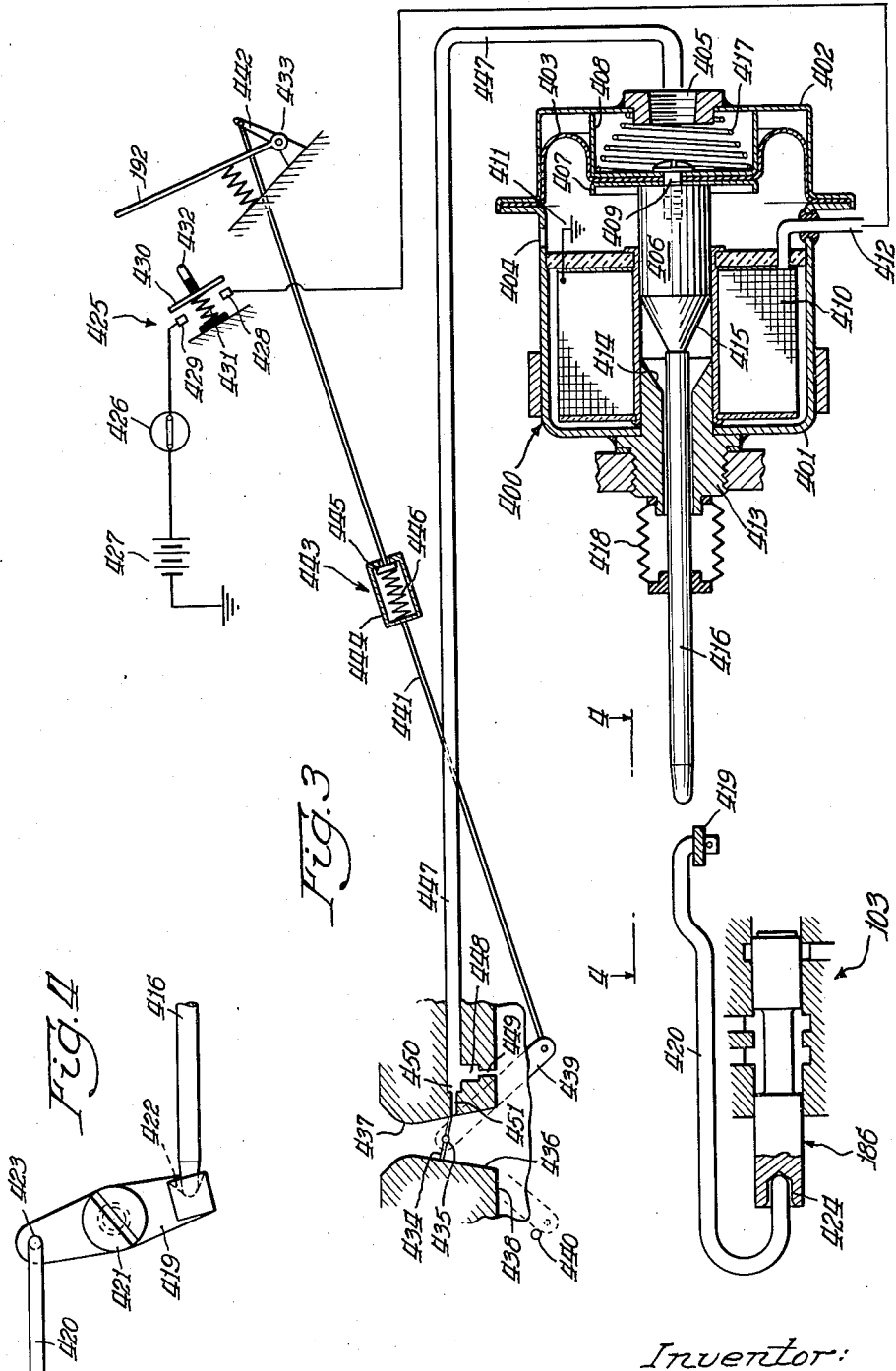

United States Patent Office 3,004,446
Patented Oct. 17, 1961

3,004,446
TRANSMISSION CONTROLS
George E. Flinn, Muncie, Ind., assignor to Borg-Warner Corporation, Chicago, Ill., a corporation of Illinois
Filed May 25, 1956, Ser. No. 587,427
25 Claims. (Cl. 74—472)

My invention relates to transmissions for automotive vehicles and more particularly to hydraulic controlling mechanism for such transmissions.

Hydraulically controlled transmissions of the general type contemplated are now in common commercial usage. One of these provides three speeds in forward drive, all of which include a hydraulic torque converter that multiplies torque. This transmission is under the control of a manually operated selector element having a drive range position and a low range position. In the drive range, the transmission starts the vehicle in intermediate speed drive, and, subsequently, the hydraulic controlling mechanism shifts or changes the transmission automatically into high speed drive. In the low range, the transmission remains in its low speed drive.

It is an object of the present invention to provide improved controls for such a transmission having a selector element with two drive range positions, in one of which the transmission will begin operating in intermediate speed drive and will subsequently upshift to direct drive and in the other of which the transmission will begin to drive the vehicle in low speed drive and will subsequently, automatically and sequentially upshift the transmission to intermediate speed drive and then to high speed drive.

More particularly, it is an object to have a range control valve in the hydraulic controls which is connected with an automatic shift valve controlling shifts between low and intermediate speed drive, the range control valve at times applying a driven shaft governor responsive pressure on the shift valve and at other times applying a relatively high fluid pressure on the shift valve holding it in its upshifted position, so that the operation in the first above-mentioned drive range may be accomplished.

In a transmission of the type mentioned, both the low and intermediate speed drives are completed by means of friction brakes. It is an object in connection with such a transmission to provide an improved mechanism for controlling the engagement and disengagement of these brakes so that changes between the low and intermediate speed drives may be accomplished without shock. More particularly, it is an object to provide improved valving under the control of the vehicle accelerator which provides a restriction in series with actuating servo motors for both brakes for all upshifts but by-passes the restriction with respect to one of the servo motors for downshifts from intermediate speed drive to low speed drive when the accelerator is in a closed throttle position.

An automatic 2-3 shift valve is provided in my improved controls in addition to the 1-2 shift valve above-mentioned, the 2-3 shift valve being effective for providing an automatic shift to high speed drive from intermediate speed drive after the 1-2 shift valve has been effective to cause a shift from low to intermediate speed drive. It is an object also to provide a shuttle valve which may be termed a "front servo release control valve" for at times connecting the 1-2 shift valve with the servo motor for the intermediate speed brake and at other times connecting the 2-3 shift valve with this brake so that both of the shift valves may at times each be effective for controlling actuation of the brake.

It is also an object in connection with the 1-2 and 2-3 shift valves to provide grooves with unbalanced hysteresis areas in these valves tending to hold each of them in either a downshifted or upshifted position, more particularly, the hysteresis area on the 1-2 shift valve holding this valve in its downshifted position and the hysteresis area on the 2-3 shift valve holding this valve in its upshifted position. It is contemplated that each of these valves shall transmit fluid pressure to the various power train completing friction engaging devices through the respective grooves and that the pressure transmitted shall increase in accordance with increases in engine throttle opening. Therefore, with the valves being in their downshifted positions, the hysteresis effect will increase with increases in throttle opening on the 1-2 shift valve but will not on the 2-3 shift valve, and it is accordingly an object of my invention to provide this throttle valve varied pressure effective also on the 2-3 shift valve tending to hold it in its downshifted position for maintaining the spacing between the shift points of these two valves approximately the same regardless of variations in the throttle controlled pressure.

The invention herein disclosed constitutes improvements on the transmission controls shown in the application of Robert W. Wayman, S.N. 166,136, filed June 5, 1950, the application of Robert W. Wayman, S.N. 249,-296, filed October 2, 1961, now Patent No. 2,770,148, my copending application (Borg-Warner Corporation S.N. 563,518, filed February 6, 1956, now Patent No. 2,893,261, and the copending application of which I and William V. Harrison are the applicants, S.N. 462,300, filed October 14, 1954, now Patent No. 2,938,403.

The invention consists of the novel constructions, arrangements and devices to be hereinafter described and claimed for carrying out the above-stated objects and such other objects, as will be apparent from the following description of preferred forms of the invention, illustrated with reference to the accompanying drawings wherein:

FIGURE 1 is a schematic view of a transmission with which my improved hydraulic controls may be used;

FIGURE 2 is a schematic illustration of the manner in which FIGS. 2A, 2B, 2C and 2D may be placed together to form a showing of the hydraulic transmission controls embodying the principles of my invention;

FIGURES 2A, 2B, 2C and 2D are schematic illustrations of parts of my improved hydraulic controls which should be placed together in the manner illustrated in FIG. 2;

FIGURE 3 is a schematic illustration of a modified part of my transmission controls; and FIGURE 4 is a view taken on line 4—4 of FIGURE 3.

Like characters of reference designate like parts in the several views.

The transmission with which my improved hydraulic controls are adapted to cooperate may be seen in FIG. 1 to comprise a drive shaft 25, a driven shaft 26 and intermediate shafts 27 and 28. The shaft 25 may be the usual crank shaft of the engine 29 of the vehicle, and the shaft 26 may be connected with the usual driving road wheels 30 of the vehicle by any suitable well-known power transmitting mechanism. The shafts 27 and 28 are in effect piloted with respect to the shafts 25 and 26. The transmission comprises in general a hydraulic torque converter 31, hydraulically operated friction clutches 32 and 33, hydraulically operated friction brakes 34 and 35 and a planetary gear set 36.

The hydraulic torque converter 31 comprises a vaned impeller element 37, a vaned rotor or driven element 38, and a vaned stator or reaction element 39. The impeller 37 is driven from the drive shaft 25, and the rotor 38 is fixed to the intermediate shaft 27. The stator 39 is rotatably disposed on a stationary sleeve 40, and a one-way brake 41 is disposed between the stator and the sleeve 40. The one-way brake 41 may be of any suitable construction, and, in the illustrated embodiment, comprises a plurality of tiltable sprags 42 disposed between an inner race surface 43 fixed with respect to the sleeve 40 and an outer race surface 44 fixed with respect to the stator 39. The one-way brake 41 is so arranged as to allow a free rotation of the stator 39 in the forward direction, that is, in the same direction in which the drive shaft rotates and which is indicated by the arrow 45 and prevents a rotation of the stator in the reverse direction.

The torque converter 31 functions in a manner well known for such torque converters for driving the rotor or driven element 38 at an increased torque with respect to the torque impressed on the impeller 37 of the converter. The vanes of the stator 39 function to change the directional flow of fluid between the rotor and impeller so as to provide this increased torque on the driven element 38. In this case, the reaction on the stator 39 is in the direction reverse to the direction of rotation of the drive shaft 25, so that the one-way brake 41 engages and prevents rotation of the stator in this direction. When the speed of the rotor 38 reaches a predetermined value, the reaction on the stator vanes 39 changes in direction, tending to rotate the stator in the forward direction; and the brake 41 releases and allows such rotation of the stator. In this case, the torque converter 31 functions as a simple fluid coupling which drives the rotor 38 at substantially the same speed and with no increase in torque with respect to the impeller 37.

The planetary gear set 36 comprises a sun gear 46 which is fixed on the shaft 28, a second sun gear 47 fixed on a sleeve portion 48 which is rotatable on the shaft 28, a ring gear 49 fixed with respect to the driven shaft 26, a plurality of planet gears 52, a plurality of planet gears 51, and a planet gear carrier 52. Each planet gear 50 and each of the planet gears 51 is rotatably disposed and carried by the carrier 52. The carrier 52 is rotatably disposed with respect to the shaft 28 and the shaft portion 48 by any suitable bearings. The planet gears 51 are each in mesh with the sun gear 46 and also with a planet gear 50. The gears 50 are also in mesh with the ring gear 49 and with the sun gear 47.

The clutch 32 is arranged to connect the shaft 27 driven by the rotor 38 with the shaft 28 and the sun gear 46 fixed thereon. The clutch 32 comprises clutch discs 53 splined on a hub member 54 which is fixed on the shaft 28. The clutch also comprises clutch discs 55 interleaved between the discs 53 and fixed within a member 56 that is in turn fixed to the shaft 27 so as to be driven by this shaft.

The clutch 32 comprises a movable pressure plate 57 splined within the member 56 and adapted to press the friction discs 53 and 55 together in frictional engagement between it and an enlarged annular part 58 of the shaft 27. An annular piston 59 is provided for actuating the movable pressure plate 57. The pressure from the piston 59 is transmitted to the pressure plate 57 through a spring strut 60 which is in the form of an annular "Belleville" washer. The strut 60 at its inner periphery is acted on by the piston 59 so that its inner pheriphery moves axially with respect to its outer periphery and moves the pressure plate 57 which is acted on by the strut 60 at intermediate points thereof. The inherent resilient action of the strut 60 functions to return the piston 59 back into its illustrated position when fluid pressure, applied as will be hereinafter described, is released from the piston.

The clutch 33 is arranged to connect the part 56 and thereby the shaft 27 with the shaft portion 48 and the sun gear 47 and comprises clutch discs 61 splined onto the member 56 and clutch discs 62 splined within a member 63 which is fixed to the shaft portion 48. A pressure plate portion 64 is fixed to the member 63 on one side of the clutch discs, and an annular hydraulic piston 65 is provided on the other side of the discs for compressing the discs between it and the pressure plate portion 64. A return spring 66 is provided for acting on the piston 65 and yieldingly holding it in its clutch disapplying position.

The brake 34 comprises a brake band 67 adapted to be contracted on the part 63 for thereby braking the sun gear 47. The brake 35 comprises a brake band 68 adapted to be contracted on a drum portion 69 of the planet gear carrier 52.

In operation, the transmission has a neutral condition and provides low, intermediate and high speed ratios in forward drive and a drive in reverse. The transmission is in neutral condition when the clutches 32 and 33 and the brakes 34 and 35 are disengaged.

The low speed forward drive may be obtained by engaging the clutch 32 and the brake 35. The clutch 32 is engaged by applying fluid pressure to the piston 59. The low speed power train exists from the drive shaft 25 through the torque converter 31, the intermediate shaft 27, the clutch 32, the shaft 28 and the planetary gear set 36 to the shaft 26. The brake 35 is effective on the carrier 52, so that the carrier 52 constitutes the reaction element of the gear set. The shaft 28, driven as just described, drives the sun gear 46 which thus constitutes the driving element of the gear set 36. The drive is transmitted through the planet gears 50 and 51 from the sun gear 46 to the ring gear 49 thus driving the shaft 26 at a reduced speed with respect to the shaft 28. Torque conversion takes place in both the hydraulic torque converter 31 and also in the gear set 36, so that the torque with which the shaft 26 is driven is the product of the torque multiplications of the hydraulic torque converter 31 and the gear set 36. It will be understood, as above described, however, that the torque conversion produced by the hydraulic torque converter 31 decreases as the speed of its driven element 38 increases, and eventually the torque converter 31 functions as a simple fluid coupling producing no torque conversion within it.

The intermediate speed power train is completed by allowing the clutch 32 to remain engaged and engaging the brake 34 in lieu of the brake 35. The flow of power for the intermediate speed power train is the same as for the low speed power train; however, for the intermediate speed power train, the sun gear 47 is the reaction element of the gear set 36 rather than the carrier 52, the gear 47 for the intermediate speed drive being held stationary by the brake 34. Since there are sets of two planet gears 50 and 51 between the sun gear 46 and the ring gear 49; and since the sun gear 47 is in mesh with the gears 50, the ring gear 49 and thereby the shaft 26 are driven at a reduced speed with respect to the shaft 28 which is, however, higher than for the low speed drive.

The high speed power train is obtained by allowing the clutch 32 to remain engaged and engaging the clutch 33 in lieu of the brake 34. The clutch 33 may be engaged by applying fluid pressure to its piston 65. In this drive, the shaft 27 is driven through the torque converter 31 from the drive shaft 25 as in intermediate speed drive. The shaft 27 is connected through the clutch 32 to drive the sun gear 46 as was the case in intermediate speed drive. The clutch 33 functions to connect the part 56, which is connected to the shaft 27, with the part 63 and thereby with the sun gear 47. Thus both the sun gear 46 and also the sun gear 47 are driven by the shaft 27, and as is well known in connection with planetary gear sets, when two elements of the gear set are driven at the same speed, the gear set becomes locked up so that all of its gears and elements rotate as a unit. There is thus a direct drive between the shafts 27 and 26. The converter 31 may be expected to function as a simple fluid coupling, generally, in this drive; and there thus exists a susbtantially direct drive between the drive shaft 25 of the transmission and its driven shaft 26.

Reverse drive may be obtained through the transmission by engaging the brake 35 and the clutch 33. The power train for this drive is from the drive shaft 25 through the torque converter 31, the intermediate shaft 27, the clutch 33, the sun gear 47, the planet gears 50 and the ring gear 49 to the driven shaft 26. The brake 35 causes the planet gear carrier 52 to function as the reaction element of the gear set; and, since there are only the single planet gears 50 between the sun gear 47 which drives and the ring gear which is driven, the ring gear 49 and the shaft 26 will be driven at a reduced speed in the reverse direction with respect to the shaft 27. For this drive, the torque converter 31 generally functions to increase torque; and thus the torque impressed on the shaft 26 is the product of the torque increases by the torque converter 31 and the planetary gear set 36.

It is believed that the construction of the transmission will be apparent from the diagrammatic illustration in FIG. 1 and that a person skilled in the art can supply the various detailed parts, such as bearings, to build an actual device; however, for an actual illustration of such detailed parts, the co-pending application of Robert W. Wayman, Serial No. 166,136, filed June 5, 1950, which discloses a similar transmission, may be referred to.

The hydraulic control system for the transmission comprises in general a front pump 100, a rear pump 101, a manual valve 102, a downshift valve 103, a throttle valve 104, a compensator valve 105, a throttle modulator valve 106, a main oil pressure regulator valve 107, a low oil pressure regulator valve 108, a rear servo apply regulator valve 109, a 2–1 control valve 110, a front servo release control valve 111, a 2–3 shift valve 112, a 3–2 control valve 113, a 1–2 shift valve 114, a range control valve 115, and a governor valve 116.

The brake 34 is applied by means of a hydraulic motor 117. The motor 117 comprises a piston 118 connected by means of a bell crank 119 and a strut 120 with one end of the brake band 67, the other end of the brake band 67 being held fixed by means of a strut 121. The motor 117 has a brake applying fluid pressure cavity 122 and a brake disapplying fluid pressure cavity 123, and a spring 124 acts on the piston tending to hold it in its brake disapplying position. Fluid pressure supplied to the cavity 122 moves the piston 118 against the spring 124 so as to move one end of the brake band 67 to engage it with the drum 63. It may be noted at this point that the direction of reaction on the sun gear 47 and the drum 63 is in the reverse direction as indicated by the arrow A when the brake 34 is engaged for the intermediate speed ratio power train. This direction is opposite the direction of rotation of the drive shaft 25 indicated by the arrow 45, and the drum 63 in tending to rotate in this direction augments the action of the strut 120 in engaging the band 67 and causes increased band engagement, since the drum 63 tends to carry the end of the band acted on by the strut 120 in the same direction in which this end of the band is urged by the strut 120. It is apparent that the band 67 wraps or is partially self-energizing for this rotative tendency of the drum 63.

The brake 35 is engaged by means of a fluid pressure motor 125 which comprises a piston 126 movable by fluid pressure applied thereto against the action of a spring 127. Motion of the piston 126 is transmitted to one end of the brake band 68 by means of a bell crank 128 and a strut 129, the other end of the brake band 68 being held fixed by means of a strut 130. In low speed drive through the transmission, the reaction on the planet gear carrier 52 and on the drum 69 is in the reverse direction as indicated by the arrow B, and this reaction or tendency to rotate tends to unwrap the band 68 with respect to the drum 69. For this direction of reaction, the brake 35 is thus self-deenergizing and provides a less braking effect than for a case in which this reaction did not exist. The reaction on the brake drum 69 for reverse drive is in the forward direction as indicated by the arrow C, that is, in the same direction as the drive shaft 25 rotates. The tendency of the drum 69 to rotate in this direction assists the strut 129 in forcing the movable end of the band 68 to move in the direction indicated by the arrow C, and the brake 35 thus wraps or is self-energizing for this direction of reaction, so that the braking effect is greater than would be the case if there were no tendency for the drum to rotate. The reaction on the drum 69 is greater for reverse drive than for low forward drive, and hence the brake 35 has been constructed to wrap for the reaction for reverse drive instead of that for low speed forward drive.

The pump 100 may be of any suitable fixed displacement type and may comprise an outer gear 133 and an inner gear 134 and a crescent shaped casing portion 135 between the gears. The gears 133 and 134 carry fluid between their teeth and across the inner and outer surfaces of the casing portion 135 so as to draw fluid from an inlet conduit 136 and discharge it into an outlet conduit 137. The inlet conduit 136 is adapted to draw fluid, such as oil, from a sump 138. The pump 100 is driven directly from the drive shaft 25 through the impeller 37. The pump 101 is of the same construction as the pump 100 and is driven from the driven shaft 26 of the transmission. The pump 101 draws fluid from the sump 138 through an inlet conduit 139 and discharges it into an outlet conduit 140.

A conduit 141 constitutes the supply or line pressure conduit for engaging the power train completing friction clutches and brakes and also for supplying various valves in the transmission control system with fluid pressure. A check valve 142 is disposed between the conduits 140 and 141 and comprises a piston 143 yieldably held in its closed position by means of a spring 144. The check valve 142 blocks fluid flow through the conduit 141 to the conduit 140 and the rear pump 101.

A similar check valve 145 comprising a piston 146 and a spring 147 acting on the piston is provided between the line pressure conduit 141 and the outlet conduit 137 for the front pump 100. The check valve 145 functions to prevent fluid flow from the line pressure conduit 141 to the conduit 137 when the pressure in the latter conduit is lower than in the conduit 141.

The main pressure regulator valve 107 functions to regulate pressure in the line pressure conduit 141. The valve 107 comprises a piston 148 having lands 149, 150, 151 and 152. A spring 153 is provided for moving the piston 148 downwardly as seen in the figure. The valve 107 comprises ports 154, 155, 156, 157, 158 and 159. The ports 156 and 157 are connected with the line pressure conduit 141, and the port 154 is connected with the outlet conduit 137 of the pump 100. The ports 155 and 159 are permanently connected around the piston 148.

The valve 108 is a regulator valve for regulating the pressure within the hydraulic torque converter 31. The valve 108 comprises a valve piston 160 having lands 161, 162 and 163. A spring 164 is provided between the land 161 and a stationary part for yieldably holding the piston 160 downwardly. The valve 108 comprises ports 165, 166, 167, 168, 169 and 170. The port 165 is connected with the ports 159 and 155 which are in permanent connection around the valve piston 148 and also with the torque converter 31 through a torque converter inlet conduit 171; the port 166 is connected with the port 158 of the valve 107; the port 167 is a bleed port adapted to discharge into the sump 138; the port 168 is connected by means of a torque converter outlet conduit 172 with the torque converter 31; the port 169 is connected with a conduit 173 which supplies lubricating oil to any suitable parts of the transmission; and the port 170 is connected by means of a conduit 174 with the pump inlet conduit 136.

The governor valve 116 is for the purpose of providing a speed responsive fluid pressure for causing various ratio changes through the transmission. The governor valve 116 comprises a casing 175 which is fixed on the driven shaft 26 and a piston 176 slidably disposed in a cavity within the casing 175. The piston 176 is provided with lands 177 and 178. The governor valve 116 comprises ports 179, 180, 181 and 182. The ports 181 and 182 are bleed ports discharging into the sump 138. A governor weight 183 extends through and is slidably disposed within the governor piston 176. The weight 183 has a spring retainer washer 184 fixed on its inner end, and a spring 185 extends between the retainer washer 184 and an internal shoulder formed within the piston 176 for yieldably holding the weight 183 and the valve piston 176 together in the relative positions in which they are illustrated.

The throttle valve 104, the compensator valve 105 and the throttle modulator valve 106 provide pressures that vary with the position of the accelerator of the vehicle for varying the shift points of the transmission and also varying the pressures that are applied to the various clutches and brakes of the transmission. The throttle valve 104 is under the control of the downshift valve 103. The downshift valve 103 comprises a valve piston 186 having lands 187 and 188. The downshift valve 103 comprises ports 189, 190 and 191. The port 190 is connected with the line pressure supply conduit 141. The valve piston 186 is under the control of the vehicle accelerator 192 by any suitable connecting mechanism, so that when the accelerator 192 is moved toward an open throttle position, it coordinately moves the piston 186 to the right as seen in the drawing. It will be understood that the accelerator 192 has the usual connections with the carburetor of the vehicle engine 29.

The throttle valve 104 comprises a piston 193 having lands 194, 195 and 196. The valve 104 comprises ports 197, 198, 199 and 200. A spring 201 is provided between the valves 103 and 104. The port 197 is connected with the line pressure supply conduit 141; the port 198 which is relatively restricted, is connected with the port 199; and the port 200 is a bleed port. A bleed port 202 is provided between the two valves 103 and 104.

The throttle modulator valve 106 comprises a piston 203 having lands 204 and 205. A sheet metal spring retainer 206 embraces an end of the piston 203, and a spring 207 is provided between the land 204 and the retainer 206. A spring 208 is provided between the land 205 and the adjacent end of the cavity in which the piston 203 is disposed. The valve 106 comprises ports 209, 210, 211, 212, 213 and 214. The ports 209 and 211 are bleed ports, and the port 210 is connected with a throttle pressure supply conduit 215 to which the ports 198 and 199 of the throttle valve 104 are also connected.

The compensator valve 105 comprises pistons 216, 217 and 218. The piston 216 constitutes a simple plug slidably disposed in a stationary sleeve 219. The piston 217 comprises lands 220, 221, 222 and 223. The piston 218 comprises lands 224, and 225. A spring 226 is disposed between the land 220 and the fixed sleeve 219, and a spring 227 is disposed between the land 220 and the movable plug 216.

The compensator valve 105 is provided with ports 228, 229, 230, 231, 232, 233, 234, 235, 236 and 237. The port 229, which is relatively restricted, and the port 228 are connected by means of a compensator pressure supply conduit 238 with the ports 158 and 166 of the pressure regulator valves 107 and 108; the port 230 is connected by means of a conduit 239 with the port 213 of the valve 106; the port 231 is connected by means of a conduit 240 with the port 212 of the valve 106; the port 232 is connected with a governor pressure supply conduit 241 that is also connected with the port 180 of the governor valve 116; the ports 233 and 234 are connected with the line pressure supply conduit 141; the ports 235 and 236 are bleed ports; and the port 237 is also connected with the governor pressure supply conduit 241.

The various ranges of operation of the transmission are under the control of the manual valve 102. The valve 102 comprises a valve piston 242 having lands 243, 244, 245 and 246. The valve is provided with ports 247, 248, 249, 250, 251, 252, 253, 254 and 255. The port 248 is connected by means of a conduit 256 and a branch conduit 257 with the piston 59 for the front clutch 32 and with the port 179 of the governor valve 116, respectively; the port 249 is connected by means of a conduit 258 with the front brake apply cavity 122 of the brake servo motor 117; the ports 250 and 251 are connected with the line pressure supply conduit 141 by means of a branch conduit 259; the port 252 is connected by means of a conduit 260 with the port 191 of the downshift valve 103; the port 253 is connected by means of a conduit 261 with the port 214 of the throttle modulator valve 106; and the port 254 is a bleed port. The manual valve piston 242 is controlled from the driver's compartment by means of a selector lever 262 located directly beneath the vehicle steering wheel 263, the selector lever being connected by any suitable connecting mechanism with the piston 242 so that the piston 242 can be moved into any of its principal positions which are "R," "N," "D2," "D1" and "L" corresponding to reverse, neutral, high range drive with the start in intermediate, high range drive with the start in low, and low range, respectively.

The 2–3 shift valve 112 causes engagement and disengagement of the proper clutch and brake (clutch 33 and brake 34) for causing changes between second and third speed drives. The valve 112 comprises pistons 264, 265 and 266. The piston 264 is a simple plug. The piston 265 is provided with lands 267, 268 and 269. A spring 270 is disposed between the land 267 and a stationary part for urging the piston 265 upwardly and a spring 271 is provided between the land 267 and the piston 264. The piston 266 is provided with lands 272 and 273. The valve 112 is provided with ports 274, 275, 276, 277, 278, 279, 280, 281, 282, 283 and 284. There are two ports 274 which are connected together and with the throttle pressure supply conduit 215; the ports 275 and 277 are connected together; there are two ports 276 connected together and by means of a conduit 285 with the port 189 of the downshift valve 103; the ports 278 and 281 are connected with the governor pressure supply conduit 241 by means of a branch conduit 286; the port 279 is connected with the piston 65 for the rear clutch 33 by means of a conduit 287; the port 280 is a bleed port; the port 282 is connected by means of a branch conduit 288 with the conduit 257 and thereby with the port 248 of the manual valve 102; the port 283 is connected with the conduit 261 and thereby with the port 253 of the manual valve 102; and the port 284 is connected by means of a conduit 289 with the port 247 of the manual valve 102.

The 1–2 shift valve 114 causes engagement and disengagement of the brakes 34 and 35 for causing changes between first and second speed drives. The valve 114 comprises a valve piston 290 provided with lands 291, 292, 293, 294 and 295. The 1–2 shift valve comprises ports 296, 297, 298, 299, 300, 301, 302, 303, 304, 305 and 306. The ports 296 and 297 are connected together; the port 299 is connected by means of a conduit 307 with the port 252 of the manual valve 102; the ports 300, 303 and 306 are bleed ports; the port 301 is connected by means of a conduit 308 and the conduit 258 with the port 249 of the manual valve 102; the port 304 is connected by means of a conduit 309 with one of the ports 276 of the 2–3 shift valve 112; and the port 305 is connected by means of a conduit 310 with the ports 275 and 277 of the 2–3 shift valve 112. A spring 311 is provided, acting on the lower end of the piston 290 urging it upwardly.

The range control valve 115 is under the control of the manual valve 102 and determines the starting speed drive for high range operation. The range control valve 115 comprises a valve piston 312 having a land 313. The valve 115 comprises ports 314, 315, 316 and 317. The port 314 is connected by means of a conduit 318 with the port 255 of the manual valve 102; the port 315 is connected with the governor pressure supply conduit 241; and the ports 316 and 317 are connected together and are connected by means of a conduit 319 with the port 298 of the 1–2 shift valve 114.

The RSA or rear servo apply regulator valve 109 is provided for the purpose of reducing by regulation the pressure applied to the servo motor 125 for the rear brake 35 in accordance with variations of throttle pressure and accelerator position. The valve 109 comprises valve pistons 320 and 321. The piston 320 is a simple plug, and the piston 321 comprises lands 322 and 323. A spring 324 is provided between the upper end of the piston 321 and the adjacent end of the cavity in which the piston is disposed. The valve 109 comprises ports 325, 326, 327, 328 and 329. The port 325 is connected by means of a conduit 330 having a restriction 331 therein with the port 302 of the 1–2 shift valve 114; the port 326 is connected with the throttle pressure supply conduit 215; and the ports 328 and 329 are connected with the servo motor 125 for the rear brake 35 by means of a conduit 332.

The 2–1 control valve 110 is provided for controlling the application of fluid to the servo motor 125 for the rear brake 35. The 2–1 control valve comprises a piston 333 having lands 334, 335 and 336. A spring 337 is provided at the lower end of the piston 333 and yieldably holds the piston 333 to the limit of its movement upwardly as seen in the drawing. The valve 110 comprises ports 338, 339, 340, 341, 342 and 343. The ports 338 and 340 are connected together and are connected by means of a branch conduit 344 with the lower end of the restriction 331; the port 339 is connected by means of a branch conduit 345 with the upper end of the restriction 331; and the port 341 is a bleed port.

The 3–2 control valve 113 functions to restrict fluid flow at times to the disapply cavity 123 of the servo motor 117 for the front brake 34 for assuring a smooth, light throttle, shift from third speed ratio to second speed ratio. The 3–2 control valve comprises a piston 346 having lands 347 and 348. A spring 349 acts on the piston 346 yieldably holding it at the limit of its movement upwardly as seen in the drawing. The valve 113 comprises ports 350, 351, 352 and 353. The port 350 is connected by means of a branch conduit 354 with the throttle pressure supply conduit 215, the ports 274 and the port 343 of the valve 110; the port 351 is connected through a restriction 355 with the conduit 287; the port 352 is connected with the conduit 287; and the port 353 is a bleed port.

The FSR or front servo release control valve 111 functions to either connect the 2–1 control valve 110 or else the 3–2 control valve 113 with the disapply cavity 123 of the servo motor 117 for the front brake 34. The FSR control valve 111 comprises a valve piston 356 having two ends 357 and 358 of reduced diameter. The valve comprises ports 359, 360, 361 and 362. The port 359 is connected by means of a conduit 363 with the port 342 of the 2–1 control valve 110; the ports 360 and 361 are connected together and are connected by means of a conduit 364 with the disapply cavity 123 of the front brake servo motor 117; and the port 362 is connected by means of a conduit 365 with the port 351 of the 3–2 control valve 113.

The downshift valve piston 186, instead of being controlled directly from the accelerator 192, may be controlled from and by means of the vacuum existing in the carburetor and in the manifold of the vehicle engine 29. Such mechanism under the control of these vacuum pressures causes the downshift valve piston 186 to be moved proportionally to the movement given the accelerator pedal 192 so that substantially the same pressures are realized from the throttle valve 104 with this manner of control as in the case in which the accelerator is directly effective on the downshift valve piston 186 as illustrated and previously described.

The vacuum controlled mechanism for the downshift valve piston 186 and for the throttle valve 104 is illustrated in FIGS. 3 and 4 and comprises a vacuum motor 400. The vacuum motor 400 comprises a casing portion 401 and a second casing portion 402 fixed thereto. A diaphragm 403 of flexible material is clamped between the casing portions 401 and 402. The casing portion 401 is provided with a vent 404 to atmosphere on one side of the diaphragm 403, and the casing portion 402 is provided with a port 405 adapted to be connected to a source of vacuum.

The diaphragm 403 is fixed to an armature 406 at the center of the diaphragm. The diaphragm is mounted between a sheet metal disc 407 on one side of the diaphragm and a hollow sheet metal cup 408 on the other side of the diaphragm, and a screw 409 extends into the armature 406 and through the cup 408, disc 407 and diaphragm 403 for clamping the diaphragm between the disc 407 and cup 408 and fixing it with respect to the armature 406.

An elelctrtic winding 410 is disposed in the casing portion 401, and the armature 406 is adapted to move into the winding 410. The winding 410 is grounded at one end 411, and at its other end it is connected to an electric lead 412.

A sleeve 413 having a tapered end surface 414 extends through the casing portion 401 and partially into the winding 410. The armature 406 has a tapered end 415 adapted to come into contact with the tapered surface 414 on the sleeve 413 when the armature 406 moves into the winding 410. The armature 406 acts on a thrust rod 416 extending through the sleeve 413, and a spring 417 is disposed within the cup 408 and within the casing portion 402 to urge the armature 406 into abutting contact with the thrust rod 416. A dust proofing boot 418 of rubber-like material is disposed about the sleeve 413 and thrust rod 416.

The thrust rod 416 is coupled with the downshift valve piston 186 by means of a lever 419 and a thrust rod 420. The lever 419 is pivoted on a stationary stud 421, and the thrust rod 416 extends into a slot 422 provided in one end of the lever 419. The thrust rod 420 extends through an opening 423 provided in the other end of the lever 419 and extends into a slot 424 provided in the outer end of the downshift valve piston 186.

The lead 412 is connected to a kickdown switch 425 which is also connected with the usual ignition switch 426 of the vehicle. The ignition switch 426 has the conventional connection with the vehicle battery 427 which has one of its terminals grounded. The kickdown switch 425 has two contacts 428 and 429 adapted to be bridged and connected by means of a switch blade 430. The blade is acted on by a spring 431 and is held thereby out of bridging relationship with respect to the contacts 428 and 429 and is provided with a stud 432 adapted to be acted on by the vehicle accelerator 192. The accelerator 192 has a conventional pivotal connection 433 with a stationary part of the vehicle for allowing depression of the accelerator by the foot of the operator in accordance with usual custom.

The carburetor of the vehicle engine 29 has the usual throttle plate or butterfly valve 434. The throttle plate 434 is fixed on a pivotally mounted shaft 435 in the relatively large diameter carburetor passage 436 located between the relatively restricted carburetor throat 437 and the usual fuel intake manifold 438 connected to the cylinders of the internal combustion vehicle engine 29. A throttle lever 439 is fixed on the shaft 435 outside of the carburetor for opening the throttle plate 434. A stop pin 440 is provided cooperating with the lever 439 for limiting the throttle opening movement of the throttle plate 434 to a wide open throttle position as shown in dotted lines, through an angle of movement of substantially 80° in the particular embodiment illustrated.

A link 441 is connected between the throttle lever 439 and a lever 442 which is fixed with respect to the accelerator pedal 192 to swing therewith about the pivotal mounting 433 of the pedal 192. A lost motion connection 443 of any suitable type is provided in the link 441. The lost motion connection 443, as illustrated, comprises a shell 444, a disc 445 slidably disposed in the shell 444, and a compression spring 446 disposed between the disc 445 and the closed end of the shell 444. The arrangement is such that the throttle plate 434 is moved from its illustrated throttle closing, engine idling position, to its fully open throttle position in which the throttle lever 439 contacts the stop pin 440 by a depression of the accelerator 192 due to force transmitted through the lever 442, the lost motion connection 443 and the link 441 to the throttle lever 439. Such movement of the throttle plate 434 is without yielding of the spring 446 in the lost motion connection 443 and before contact of the accelerator 192 with the switch stud 432. When the accelerator is moved still farther out of and beyond its fully opened throttle position, such movement is by virtue of a yielding by the spring 446 and the lost motion connection 443 without any additional movement of the throttle lever 439 and throttle plate 434, and the accelerator 192 in such movement contacts the switch blade 430 and moves the switch blade 430 into contact with the switch contacts 428 and 429.

The port 495 of the motor 400 is connected by means of a vacuum conduit 447 with both the manifold 438 and also with the carburetor passage 436. The conduit 447 is connected with a branch passage 448 which is connected with the manifold 438 through a restricted opening 449. The conduit 447 is also connected with a branch passage 450 which is connected with the carburetor passage 436 by means of a restricted opening 451. It will be noted that the restricted opening 451 is disposed immediately beneath one edge of the throttle plate 434 when the plate is in its throttle closing, engine idling, position in which it is shown in full lines. The connection of the vacuum motor 400 with both the manifold 438 and also with the throttle opening 436 provides a vacuum pressure in the conduit 447 that varies much more closely with torque demand by the vehicle operator as evidenced by the depression of the vehicle accelerator 192 than the pressure that exists in the manifold 438 alone. The restricted opening 451 is preferably smaller than the restricted opening 449, and in an actual embodiment, satisfactory operation was obtained with the restricted opening 451 being .028 inch in diameter and the restricted opening 449 being .032 inch in diameter.

In operation, referring to FIGS. 1, 2 and 2A to 2D, the transmission is maintained in its various ranges under the control of the manual valve 102. The transmission is in neutral conditon when the manual selector valve piston 242 in its "N" or neutral position. When the engine 29 begins operating, the pump 100 driven by the engine supplies line pressure to the conduits 137 and 141 and connected conduits, pumping oil from the sump 138 through the pump inlet 136. The conduit 141 is connected with the conduit 137 through the check valve 145, the check valve 145 being held open by the fluid pressure from the pump 100. This fluid pressure in the conduit 141 holds the check valve 142 closed so that fluid cannot escape through the rear pump 101, which is assumed inoperative at this time with the vehicle being stationary. In the neutral position of the piston 242, the groove between the lands 244 and 245 connects the ports 250 and 251 supplied with line pressure through the conduits 259 and 141, and the lands block flow of line pressure to any of the other ports in the manual valve 102. The manual valve piston 242 thus prevents application of fluid pressure to the engaging pistons for any of the power train completing clutches and brakes of the transmission.

The main oil pressure regulator valve 107 functions for all conditions of the transmission and its hydraulic control system to regulate the line pressure in the conduit 141 and connected conduits to predetermined maximum values. For this purpose, the line pressure from the conduit 141 is supplied through the port 157 between the lands 151 and 152; and, since the land 151 is of larger diameter than the land 152, the line pressure applied to these lands tends to move the regulator valve piston 148 upwardly against the action of the spring 153. This movement of the piston 148 tends to release the line pressure from the conduit 141 between the lower edge of the land 150 and edges of the ports 155 and 159 into the converter supply conduit 171. The spring 153 is of such strength that the ports 155 and 159 will not be thus opened by line pressure influence on the valve piston 148 until a certain fixed value of line pressure is reached. This value of line pressure is maintained by the valve 107 in thus metering and relieving excess fluid under pressure from the conduit 141, assuming that there are no other influences on the piston 148 than just mentioned.

For most conditions of operation, however, an additional variable force is applied to the piston 148 tending to move it, and this third force is due to fluid pressure of different values (which may be termed "compensator pressure") applied to the lower end of the piston 148 through the port 158 and conduit 238. For the neutral condition of the transmission when the accelerator 192 is in its closed throttle, relaxed position; the compensator pressure is equal to full line pressure which is supplied to the lower end of the piston 148 through the port 158. Line pressure flows from the conduit 141 through the port 234 of the compensator valve 105, the groove between the lands 220 and 221, the port 228 and the conduit 238 to the port 158. Line pressure is supplied from the compensator pressure conduit 238 through the port 229 on to the lands 221 and 222; and, since the land 221 is larger than the land 222, this line pressure tends to move the compensator valve piston 217 to the left against the action of the springs 227 and 226. However, for this condition of operation, the springs acting on the piston 217 are of sufficient strength to hold the piston to the limit of its movement to the right.

The fluid pressure applied to the main oil regulator valve piston 148 on its lower end provides a force acting against the spring 153 tending to move the piston 148 upwardly as seen in the figure to more fully open the ports 155 and 159 to the groove between the lands 150 and 151. The full line pressure applied to the lower end of the piston 148 thus maintains the line pressure in the conduit 141 and connected conduits at a predetermined minimum, which for one certain embodiment of the invention is 75 pounds per square inch.

The secondary main regulator valve 108 regulates the fluid pressure within the conduit 171 and thereby within the torque converter 31 to which the conduit 171 supplies fluid pressure. The pressure in the ports 155 and 159 and in the conduit 171 and between the lands 150 and 151 of the main regulator valve piston 148 is applied between the lands 161 and 162 of the low oil pressure regulator valve piston 160 through the port 165. Since the land 161 is larger than the land 162, this fluid pressure tends to move the piston 160 upwardly against the action of the spring 164 to open up the port 169 and meter fluid between the land 161 and an edge of the port 169. Thus, as the fluid pressure in the conduit 171 and in the converter 31 tends to increase, the excessive fluid pressure is discharged through the port 169; and the pressure in the conduit 171 and converter 31 is regulated to a predetermined maximum.

The conduit 173 is connected to various working parts of the transmission for lubricating them; and, when this conduit is filled, the valve piston 160 moves slightly farther against the action of the spring 164 on a slight increase in pressure in the converter 31 so as to relieve fluid from the port 168 through the groove between the lands 162 and 163 and through the bleed port 167. At this time, the regulating effect of the valve 108 takes place between the land 162 and the lower edge of the port 168, and the fluid flows through the conduit 171 and through the torque converter 31 to the conduit 172 which is the fluid discharge conduit for the torque converter 31.

The compensator pressure in the conduit 238 is also applied to the valve piston 160 for changing the regulated converter pressure in the conduits 171 and 172 and in the torque converter 31 for various conditions of operation of the transmission and controls. The pressure on the lower end of the valve piston 160 tends to move the piston 160 upwardly against the action of the spring 164 to open the discharge port 168 for the torque converter to the bleed port 167 and to thus further relieve and decrease the pressure in the conduits 171 and 172 and converter 31. With full line pressure in the conduit 238 for conditions of operation just mentioned, the regulated converter pressure in the torque converter 31 is at a minimum, which, for one particular embodiment of the invention is substantially 30 pounds per square inch.

Under certain relatively abnormal conditions, as, for example, when the oil in the sump 138 is cold, the conduit 174 relieves the fluid pressure in the converter 31 and in its supply conduit 171. The resultant increased pressure due to cold oil in the conduit 171 applied to the relatively large land 161 will move the piston 160 still farther upwardly against the action of the spring 164 so as to connect the ports 170 and 165 by means of the groove between the lands 161 and 162. In this case, the regulating action by the valve piston 160 is by virtue of a metering effect between the lower edge of the land 161 and the port 170, and the excessive fluid flowing through the port 170 flows directly through the conduit 174 to the inlet 136 of the pump 100.

The transmission and its control system are conditioned for operation in D2 range, that is, in automatic range in which the vehicle is started in intermediate speed drive, by moving the manual selector valve piston 242 into its D2 position. In this position, the piston 242 provides a connection between the ports 255, 247, 248, 249 and 250 by means of the groove between the lands 243 and 244. The port 250 carries line pressure, being connected with the line pressure supply conduit 141 by means of the branch conduit 259. Line pressure is thus supplied to the ports 255, 247, 248 and 249.

The line pressure from the port 255 flows through the connected conduit 318 to the port 314 of the range control valve 115. Line pressure is thus supplied on the lower end of the piston 312 of the range control valve and moves this valve piston to the limit of its movement upwardly thereby connecting the port 317 with the port 314. Line pressure is thus supplied to the port 317 and to the port 298 of the 1–2 shift valve 114 through the conduit 319. Line pressure is supplied from the port 298 to the upper end of the 1–2 shift valve piston 290 and moves the piston downwardly against the action of the spring 311 to the limit of its movement in this direction. As will be apparent from subsequent description of operation, the 1–2 shift valve has a low speed position and a second speed position which are respectively to the limit of its movement upwardly and to the limit of its movement downwardly, and this application of line pressure to the upper end of the 1–2 shift valve piston 290 holds this piston in its second speed position so that first speed cannot be operative in the D2 range.

The line pressure supplied through the port 247 of the manual valve 102 provides line pressure to the port 284 of the 2–3 shift valve 112 through the conduit 289. This line pressure supplied to the 2–3 shift valve 112 is subsequently used, on a shifting of the 2–3 shift valve piston 265 out of the second speed position of this piston, in which it is illustrated, downwardly to its high speed position, for engaging the rear clutch 33 for direct drive as will be subsequently explained.

The line pressure supplied to the port 248 of the manual valve 102 flows through the conduit 256 to the piston 59 of the front clutch 32 and thus applies this clutch. Line pressure from the port 248 also flows through the branch conduit 257 to the governor valve 116, particularly to the fluid inlet port 179 of the governor valve 116. The valve 116 modulates and regulates the line pressure supplied to the port 179, producing a governor pressure in the port 180 and in the governor outlet conduit 241 that increases with vehicle speed, as will be subsequently explained. Line pressure from the port 248 of the manual valve 102 also flows through the branch conduit 288 to the port 282 of the 2–3 shift valve 112 for purposes to be subsequently explained.

The line pressure supplied to the port 249 of the manual valve 102 flows through the conduit 258 to the brake apply cavity 122 of the front brake servo motor 117. The line pressure acting on the piston 118 moves the piston against the action of the spring 124 and applies the brake band 67 on its drum by means of the lever 119 and the strut 120. Thus the brake 34, as well as the front clutch 32, are engaged; and the intermediate speed power train through the transmission is completed. Line pressure also flows from the port 249 of the manual valve 102 through the conduit 308 to the port 301 of the 1–2 shift valve 114; however, in the intermediate speed position of the piston 290 in which the piston is disposed at this time, the land 294 blocks the port 301; and the fluid pressure applied to this port thus has no effect.

When the intermediate speed power train is completed as just described by engagement of the clutch 32 and brake 34, the accelerator 192 is assumed to be in its closed throttle position with the vehicle engine crank-shaft rotating at idling speeds. Under these conditions, insufficient power is transmitted through the intermediate speed power train and in particular through the hydraulic torque converter 31 for driving the driven shaft 26 and the vehicle, and the drive may be made effective for driving the vehicle by simply depressing the accelerator 192 to open the engine throttle.

Throttle opening movement of the accelerator 192 also has other effects on the hydraulic control system, including an increasing of the line pressure in conduit 141 and connected conduits for increasing the applying pressure for the brake 34 and the clutch 32, and throttle opening movement also effects an increasing of the fluid pressure within the hydraulic torque converter 31.

The accelerator 192 acts on the throttle valve piston 193 through the intermediary of the downshift valve piston 186 to provide a throttle pressure in the conduit 215 which is less than the line pressure in the conduit 141 and which increases from zero at closed throttle position of the accelerator to line pressure at open throttle position. The throttle valve 104, like the valves 107 and 108, is a regulator valve providing a variable fluid pressure by metering fluid flow between a valve land and a valve port in accordance with variable forces impressed on the valve. The accelerator 192 tends to move the throttle valve piston 193 to the right as seen in the figure, upon depression of the accelerator, by means of the downshift valve piston 186 and the spring 201. Such movement of the throttle valve piston 193 provides a connection between the ports 197 and 199 through the groove between the lands 194 and 195, admitting fluid under pressure into the conduit 215 through the port 199. The pressure in the conduit 215 flows back through the port 198 and is thus effective on the lands 195 and 196. Since the land 195 is of larger diameter than the land 196, the fluid pressure on the lands tends to move the valve piston 193 back to the left against the action of the spring 201, so that the land 195 tends to again close the port 197 and block further admittance of fluid pressure to the conduit 215. The greater the depression of the accelerator, the greater will be the force from the spring 201 on the throttle valve piston 193, and the greater must be the pressure in the conduit 215 for closing the port 197 by the land 195, and hence the valve 104 has a regulating action to provide a throttle pressure in the conduit 215 which increases with accelerator depression.

The throttle pressure from the throttle valve 104 is supplied through the conduit 215 to the throttle modulator valve 106 through the port 210. The valve 106 functions to provide a limited or so-called modulator pressure in the conduit 239. This limited pressure in conduit 239 is the same as the throttle pressure in conduit 215 up to a predetermined maximum value, and for further increases in throttle pressure corresponding to increased openings of the engine throttle, the modulator pressure in conduit 239 remains at this predetermined maximum value. The throttle pressure in conduit 215 inflows through the port 210 of the throttle modulator valve and through the groove between the lands 204 and 205 to the port 213 and the conduit 239. The spring 208 is a relatively light spring as compared to the spring 207, and this spring 208 functions to normally maintain the valve piston 203 in its illustrated position with the spring retainer 206 contacting the adjacent end of the bore for the piston 202 and with the spring 207 holding the retainer 206 and the piston 203 at the limit of their movement apart. The spring 208 under these conditions is substantially at its free length and assures that the ports 210 and 213 remain in communication by means of the groove between the lands 204 and 205 until the modulator pressure in the conduit 239 reaches its predetermined value.

The modulator pressure in the conduit 239 is applied to the lands 204 and 205, and since the land 204 is larger than the land 205, this fluid pressure tends to move the piston 203 to the left against the action of the spring 207, the spring retainer being bottomed under these conditions on the adjacent end of the cavity in which the piston 203 is disposed. When the fluid pressure in the conduit 239 reaches its predetermined maximum value, the pressure moves the piston 203 to the left and closes the port 210 by means of the land 205, so that the pressure of the fluid in the conduit 239 increases no further. In the particular embodiment of the invention mentioned before, the modulator pressure in the conduit 239 had a maximum of 22 pounds per square inch at about 25% throttle opening, and the modulator pressure remained constant for additional throttle opening movements of the accelerator.

The modulator pressure in the conduit 239 is applied to the compensator valve 105, which is a regulator valve, for providing a compensator pressure in the conduit 238 that decreases with depression of the accelerator pedal for initial throttle opening movements of the accelerator. The compensator pressure in conduit 238 also increases with the speed of the driven shaft 26 and the vehicle. In this connection, the action of the governor valve 116 in producing a governor pressure in conduit 241, which is connected to the compensator valve, will now be described.

The governor valve 116, like the valves 104, 105, 107 and 108, is a regulator valve; that is, it produces an output pressure that varies gradually with changing forces on the valve. The casing 175 for the valve 116 rotates with the driven shaft 26 of the transmission, and the valve piston 176 and weight 183 tend to move outwardly under the influence of centrifugal force. The weight 183 in particular has a relatively large centrifugal force acting on it, and this force is transmitted to the hollow valve piston 176 by means of the spring 185 disposed between the piston 176 and the spring retainer 184. Line pressure is present in the conduit 257; and on outward movement of the valve piston 176, fluid flows through the port 179, the groove between the lands 177 and 178, and the port 180 into the conduit 241 to supply pressure to the latter conduit. The pressure in the conduit 241 is applied to the facing ends of the lands 177 and 178; and, since the land 178 is larger in diameter than the land 177, this fluid pressure tends to move the piston 176 inwardly of the valve casing 175, so that the land 177 will move over the port 179 and block any further admission of fluid pressure to the conduit 241. A balance is attained between the centrifugal force effective on the valve piston 176 tending to move the piston outwardly of the casing 175, which increases with vehicle speed, and the force drived from the fluid pressure in the conduit 241 effective on the lands 177 and 178 tending to move the piston 176 inwardly, which increases with the pressure in the conduit 241, for every speed of the driven shaft 26. The valve piston 176 thus meters the flow of fluid under pressure to the governor output conduit 241 between the land 177 and the inner edge of the port 179 and provide a regulated governor pressure in the conduit 241 that increases with the speed of the driven shaft 26 and of the vehicle. The function of the spring 185 effectively between the weight 183 and the valve piston 176 is to allow the weight 183 to move outwardly of the casing 175 and radially with respect to the shaft 26 without corresponding movement of the piston 176 at the higher speeds of the shaft 26. This arrangement provides a governor pressure that increases more gradually with increases in speed of the driven shaft 26 than would be obtained if the piston 176 has a solid connection with the weight 183.

The governor pressure in conduit 241 that increases with the speed of the driven shaft 26 and of the vehicle is impressed through the ports 232 and 237 on the compensator valve 105 and particularly on its pistons 216 and 218. The governor pressure applied on the piston 218 through the port 232 is not immediately effective on the piston 217, which is the regulating piston of the compensator valve 105, when the vehicle is being started, since line pressure is applied between the lands 224 and 225 from the conduit 141 and port 233. The governor pressure starts from zero when the vehicle is at a standstill and increases, while the line pressure is at some much higher value, such as 75 pounds per square inch under the same conditions. Since the land 225 is larger than the land 224, the piston 218 is held to the limit of its movement to the right out of contact with the regulating piston 227 until the governor pressure increases sufficiently to overcome the effect of line pressure on the lands 224 and 225. The governor pressure in the conduit 241 is initially, at low speeds of the vehicle, effective through the valve piston 216 on the regulating piston 217. The governor pressure is applied through the port 237 on the piston 216, and force on the piston 216 is transmitted through the spring 227 to the piston 217 tending to move the latter to the right, the force so impressed on the piston 217 increasing with governor pressure and vehicle speed.

The modulator pressure in the conduit 239 that increases with accelerator opening to a predetermined maximum is impresesd on the lands 222 and 223; and since the land 222 is larger than the land 223, this modulator fluid pressure tends to move the compensator piston 217 to the left. This is just opposite to the effect of the increasing governor pressure in the conduit 241.

Line pressure is supplied to the port 234 from the conduit 141, and the piston 217 functions to regulate so as to provide compensator pressure in the conduit 238. This compensator pressure increases with increasing governor pressure in the conduit 241 and decreases with increasing throttle pressure in the conduit 215 and modulator pressure in the conduit 239. The springs 226 and 227 tend to hold the piston 217 to the limit of its movement to the right, opening the port 234 by means of the groove between the lands 220 and 221 to the port 228 and the compensator conduit 238. Fluid thus flows into the compensator conduit 238. The compensator pressure in the conduit 238 flows through the port 229 between the lands 221 and 222 and tends to move the piston 217 to the left so as to close the port 234 by means of the land 221, this return movement of the piston 217 being by virtue of the fact that the land 221 is larger than the land 222. Thus, the land 221 meters fluid flow between it and an edge of the port 234, providing a certain regulated compensator pressure in the conduit 238. The governor pressure tends to move the piston 217 to the right as above described, so as to move the land 221 off the port 234 and admit further fluid pressure to the compensator conduit 238. Thus, the compensator pressure in the conduit 238 increases with governor pressure and vehicle speed. The modulator pressure, as above described, tends to move the piston 217 to the left to close the line pressure supply port 234 by means of the land 221, and thus the compensator pressure in the conduit 238 decreases with increasing throttle pressure and modulator pressure.

The piston 218, at higher speeds of the vehicle, reduces the effect of the governor pressure just described in increasing the compensator pressure in the conduit 238. As the governor pressure in the conduit 241 rises, eventually it is sufficient so as to move the piston 218 to the left so that this piston acts on the piston 217 and tends to move the latter piston to the left against the action of the governor pressure transmitted through the piston 216. The piston 218 is moved to the left by the governor pressure when the governor pressure overcomes the effect of the line pressure impressed through the port 233 on the lands 224 and 225 tending to move the piston 218 to the right. The line pressure in the conduit 141 and applied to the lands 224 and 225 decreases with increasing governor speeds, as will be hereinafter described, and there thus exists a crossing of the effect of line pressure which decreases with increasing vehicle speed and governor pressure which increases with vehicle speed, both effective on the piston 218, after which the piston 218 is effective on the valve piston 217 and its regulating action.

When the vehicle begins to move, after the accelerator 192 has been moved toward its open throttle position to increase the speed and power output of the vehicle engine, the rear pump 101 begins its pumping action and draws fluid through the intake conduit 139 from the sump 138 and discharges it into the outlet conduit 140. The check valve 142 remains closed until the pressure of the fluid discharged by the rear pump 101 increases to a sufficient value to overcome the forces due to the line pressure and the spring 144 on the piston 143; and at this time, the check valve 142 opens and the rear pump discharges into the line pressure conduit 141. The fluid flow through the line pressure conduit 141 then reverses and closes the check valve 145 by moving the piston 146 upwardly onto its seat. The closing of the check valve 145 blocks discharge by the front pump 100 into the line pressure conduit 141 and its connected conduits, and the rear pump now becomes the sole supply of line pressure for the conduit 141 and connected conduits. The line pressure in the conduit 141 is impressed on the main oil pressure regulator valve piston 148 and particularly its lands 151 and 152 through the port 157 to provide the regulating action between the land 149 and the port 154 when the front pump alone is providing the line pressure, and when the line pressure increases slightly due to closing of the check valve 145 and opening of the check valve 142 as just described, the piston 148 is moved upwardly slightly, since the line pressure is effective to move the piston 148 in this direction due to the land 151 being larger than the land 152. Under these conditions, the port 154 is fully opened so as to connect the ports 154 and 159. The regulating effect of the valve 107 is now between the lower edge of the land 150 and the lower edges of the ports 155 and 159, with the excess pressure produced by the rear pump 101 escaping from the port 156 and the groove between the lands 150 and 151 to the ports 155 and 159. With the rear pump 101 being thus active to produce the line pressure, the line pressure is now regulated exactly as has been previously described, except that it is slightly higher in value and is metered between the land 150 and ports 155 and 159 instead of between an edge of the port 154 and the land 149. The front pump now functions solely to supply fluid under pressure to the converter 31 and for lubrication.

The compensator pressure in conduit 238, as it changes with accelerator opening and vehicle speed, causes a change in the line pressure regulating action of the main oil pressure regulator valve 107 as compared with its operation when the accelerator is in its closed throttle position and the vehicle is stationary. The pressure in the conduit 238 is impressed on the lower end of the main oil pressure regulator valve piston 148 through the port 158 and tends to move the piston 148 upwardly against its spring 153 to more fully open the port 154 or the ports 155 and 159 depending on which of these ports is regulating, with the driven shaft pump 101 being inactive in one case and active in the other case. The piston 148 thus vents the line pressure conduit 141 less and maintains the line pressure in the conduit 141 at a higher value as the compensator pressure in the conduit 238 decreases and acts conversely to maintain line pressure at a lower value as the compensator pressure increases.

As has been explained, the compensator pressure in the conduit 238 increases with increasing governor pressure in the conduit 241 and increasing vehicle speed and decreases with increasing throttle pressure and throttle opening. Therefore, the line pressure, which is initially supplied to the servo motor 117 for the front brake 34 and also to the piston 59 for the front clutch 32 for engaging these friction devices when the selector valve piston 242 is in its D2 position, increases with accelerator opening and decreases with increasing vehicle speed. The line pressure is made to increase with increased accelerator opening so that the front clutch 32 and the front brake 34 have the capacity to take the additional torque from the vehicle engine which results from depression of the accelerator 192 and opening of the engine throttle. As has been hereinbefore explained, the hydraulic torque converter 31 is of the usual type providing a decreased torque multiplication as the speed increases; and, therefore, line pressure can be and is decreased with increasing governor pressure and vehicle speed since the engaging devices in the gearing behind the torque converter 31 need take a decreasing torque with the decreasing torque multiplication of the torque converter 31. The line pressure is also suplied to the servo motor 125 for the brake 35 and to the piston 65 for the clutch 33 for engaging these friction devices when the transmission is in low speed drive or high speed drive as will be described. The line pressure is made to vary as above described, in accordance with throttle opening and vehicle speed, so that the engaging pressures of the friction brakes and clutches are just a little higher than is required to carry the torque by each of these clutches and brakes as the vehicle speed and engine throttle opening vary. It has been found that, if these clutches and brakes are engaged for changing drives through the transmission with such engaging pressures which are just a little higher than sufficient for carrying the torque, the engagement of these friction engaging devices and the consequent completions of the power trains are relatively smooth.

The compensator pressure in the conduit 238 functions on the low oil pressure regulator valve 108 to cause an increase in the pressure within the torque converter 31 as the accelerator is depressed and to cause a decrease in the pressure within the torque converter 31 as the vehicle speed increases. The compensator pressure is applied to the lower end of the regulator valve 108 and tends to move the piston 160 upwardly against the action of the spring 164 so as to increase the metering effect between the land 162 and the lower edge of the port 168, thereby relieving a greater amount of fluid from the torque converter 31 flowing through the outlet conduit 172 of the torque converter 31. Thus, as the compensator pressure in the conduit 238 increases, the bleeding effect of the valve 108 is increased to decrease the fluid pressure in the converter 31; and, as the compensator pressure decreases, this bleeding effect decreases to cause an increase in the pressure in the torque converter 31. Thus, the pressure in the torque converter 31 is increased as the vehicle accelerator is moved toward open throttle position, and the pressure in the torque converter 31 is decreased as the vehicle speed increases. This regulating action of the fluid pressure in the torque converter 31 is provided, since a greater fluid pressure is required in the torque converter with increasing torque output of the vehicle engine, and a decreasing pressure in the torque converter 31 is sufficient with decreased torque multiplication by the torque converter with increasing vehicle speeds.

The 2–3 shift valve 112 has the governor pressure from the conduit 241 impressed on it through the branch conduit 286 and the ports 281 and 278. The governor pressure is effective on the upper end of the valve piston 266 and on the upper surface of the land 267 and tends to move the piston 266 and the piston 265 downwardly out of the intermediate speed drive positions of the pistons in which they are illustrated into their high drive positions. This movement of the valve pistons 265 and 266 is opposed by four different forces, namely, throttle pressure exerted through the plug 254, and the spring 271, a "shift valve plug pressure" applied on the lower face of the land 267, the force due to the spring 270, and the force due to line pressure applied to the lower face of the land 273. The throttle pressure is applied to the lower end of the valve piston 264 through the conduit 215 and the port 274, and this throttle pressure is effective through the spring 271 tending to oppose movement of the piston 265 downwardly. The spring 270 is effective between the land 267 and a fixed part and also tends to hold the piston 265 against such movement. Line pressure is applied from the conduit 288 and port 282 between the lands 272 and 273, and since the land 273 is larger than the land 272, the line pressure thus produces a resultant force on the piston 266 opposing its movement downwardly.

The plug 264 functions as a regulator valve to provide the "shift valve plug pressure" effective on the land 267. The throttle pressure in the conduit 215 applied to the lower end of the plug 264 tends to move the plug against the action of the spring 271 so as to open the port 275 and thereby supply pressure to the conduit 310 and the port 277 of the 2–3 shift valve. The pressure supplied to the port 277 flows into the cavity for the valve piston 265 and acts on the upper end of the plug 264 tending to return the plug 264 downwardly to a position blocking the port 275. The plug 264 thus functions as a regulating valve, opening the port 275 on an increase in throttle pressure and closing the port 275 when the pressure within the conduit 310 and within the cavity for the piston 265, which is termed the "shift valve plug pressure," becomes sufficient to augment the force due to the spring 271 sufficiently so as to move the plug 264 downwardly. This "shift valve plug pressure" increases with throttle pressure but is less than throttle pressure by a predetermined amount due to the force provided by the spring 271 on the plug 264. This "shift valve plug pressure" in the cavity for the piston 265 is applied on the lower face of the land 267 and also, in addition to the other three forces above mentioned, tends to hold the piston 265 from movement downwardly into its high speed drive position.

When the governor pressure in the conduit 241, which is applied on the 2–3 shift valve 112 through the ports 281 and 278, becomes sufficiently great, so that it overcomes the force on the pistons 265 and 266 due to the "shift valve plug pressure" on the lower face of the land 267, the force due to the spring 270, the force due to the throttle pressure on the plug 264 exerted through the spring 271 on the piston 265 and the force due to the line pressure applied through the port 282; the pistons 264, 265 and 266 move to the limit of their movement downwardly into their high speed positions in which the groove between the lands 268 and 269 connects the ports 284 and 279. Line pressure is supplied to the port 284 of the 2–3 shift valve 112 from the conduit 289 and the port 247 of the manual valve 102, and line pressure thus flows between the lands 268 and 269, the port 279, and the conduit 287 to the piston 65 for the rear clutch 33 and engages the rear clutch 33. The front clutch 32 remains engaged, and the high speed power train is thus completed through the transmission.

The line pressure in the conduit 287 also flows to the disapply cavity 123 of the servo motor 117 for the front brake 34. It is assumed that the shift from intermediate speed drive to direct drive is made when the accelerator 192 is in a partially opened throttle position; and, under these conditions, there is an appreciable throttle pressure in the conduit 215. This throttle pressure is applied through the branch conduit 354 on the upper end of the 3–2 control valve piston 346, and the piston 346 is thus held at the limit of its movement downwardly against the action of the spring 349 effective on the piston. The line pressure in the conduit 287 thus flows through the port 352 of the valve 113, the groove between the lands 347 and 348 of the 3–2 control valve piston 346, the port 351, the conduit 365 and the port 362 to the front servo release control valve 111. The line pressure in the port 362 acts against the front servo release control valve piston 358 and moves it to the limit of its movement upwardly so as to connect the ports 362 and 361. Line pressure thus flows from the port 362 through the port 361 and the conduit 364 to the disapply cavity 123 of the front brake servo motor 117. The forces due to line pressure in the cavity 123 and the spring 124 tending to move the piston 118 to disengaging position overcome the force due to line pressure on the other side of the piston 118, and the piston 118 moves to release the brake 34. Thus, the intermediate speed power train is broken, as the direct drive power train is completed.

A downshift from high speed drive to intermediate speed drive may be obtained with the accelerator 192 released and with the vehicle coasting with decreasing speed to a stop. Under these conditions, the governor pressure applied to the upper end of the 2–3 shift valve 112 is decreasing, and the throttle pressure applied to the plug 264 and the shift valve plug pressure applied on the lower face of the land 267 are substantially zero. Eventually, the governor pressure will decrease to the point at which the springs 271 and 270 and the line pressure applied to the land 273 are effective so as to move the pistons 265 and 266 to the limit of their movement upwardly into the intermediate speed positions of the pistons. The line pressure at the port 284 in the intermediate speed position of the piston 265 is blocked by the land 268, and the conduit 287 and its port 279, which have fluid pressure applied to them for completing the high speed drive, are drained to the sump through the port 283, the conduit 261, the port 253 of the manual valve 102, the groove between the lands 245 and 246 and the bleed port 254. The draining of fluid pressure from the conduit 286 causes the rear clutch 33 to disengage thus breaking the high speed drive.

When the throttle pressure is very low, as with the accelerator 192 released, the 3–2 control valve piston 346 is in its illustrated position, the spring 349 having moved the piston 346 to the limit of its movement upwardly when the throttle pressure applied to the upper end of the piston 346 through the conduits 354 and 215 decreases to a low value. The pressure in the disapply cavity 123 of the servo motor 117 for the front brake 34 is drained, under these conditions, through the conduit 364; the ports 361 and 362, the conduit 365; and the restriction 355 to the conduit 287, which is drained to the sump as has been previously described. The land 347 of the valve 346 blocks the port 352, and therefore, the fluid from the disapply cavity 123 must pass through the restriction 355 which retards its flow and retards the application of the front brake 34 which is due to the presence of line pressure in the apply cavity 122 remaining in this cavity for all operation in the D2 range. The restriction 355 is put in the draining conduit for the disapply cavity 123 under the condition for released accelerator due to the fact that the rapid application of the front brake 34, which would otherwise result, would cause an undue lurch and shock to the vehicle; and the delayed application of the front brake 34 also limits noise, which would result due to the brake 34 being applied before the rear clutch 33 is disengaged. In connection with the 2-3 shift valve piston 265, it should be noted that the land 268 is slightly larger than the land 269; and hence the line pressure that is between the lands 268 and 269, when the groove between these lands connects the ports 284 and 279 for the high speed drive operation, tends to hold the piston 265 in its direct drive position. Hence, all other factors being equal, the pistons 265 and 266 will move into their intermediate speed positions at a lower governor speed than that at which they are shifted into their high speed drive positions, and hunting movement of the pistons 265 and 266 is thus prevented.

A kickdown, that is, a downshift at open throttle position of the accelerator 192, may be had due to the action of the downshift valve 186. Movement of the accelerator 192 to an open throttle position and a corresponding movement of the downshift valve piston connects the ports 189 and 190 by means of the groove between the lands 187 and 188. The port 190 is connected with the line pressure supply conduit 141, and line pressure is thus supplied through the port 189 and the conduit 285 connected therewith to a port 276 of the 2-3 shift valve 112. Assuming that the transmission is in direct drive and the pistons 264, 265 and 266 are in their direct drive positions to the limit of their movement downwardly, the port 276 is open with respect to the land 267; and line pressure from the port 276 is thus applied onto the lower face of the land 267. This application of line pressure moves the pistons 265 and 266 to the limit of their movement upwardly into their intermediate speed drive positions, assuming that the vehicle is not travelling at an unduly high speed at which the governor pressure applied to the upper end of the piston 266 would be sufficient to prevent this movement. The shift valve piston 265 in its intermediate speed position drains the conduit 287 as previously described so as to disengage the rear clutch 33 and cause engagement of the front brake 34 by a draining of the disapply cavity 123 of the servo motor 117 for this brake. Since the throttle pressure under these conditions is high, the 3-2 control valve piston 346 will be at the limit of its movement downwardly; and the disapply cavity 123 of the servo motor 117 is drained through the wide open ports 352 and 351 and the groove between the lands 347 and 348 of the 3-2 control valve piston 346 rather than through the delay restriction 355. Under high engine torque conditions, a delay of application of the front brake 34 is neither desired nor required, and immediate engagement of the front brake 34 provides a smooth downshift from direct drive to intermediate drive.

The manual valve 102 in its D1 position so controls the transmission that it will start in low speed drive and on increasing vehicle speed will shift into intermediate speed drive and thereafter will subsequently shift into high speed drive. The manual control valve piston 242 in its D1 position connects the same ports with the line pressure supply port 250 as were connected in the D2 position of the manual valve piston 242 with the exception that the port 255 is blocked with respect to the port 250 and is drained through the front end of the cavity in which the manual valve piston 242 is disposed. The release of fluid pressure in the port 255 causes a corresponding bleeding of fluid pressure from the lower end of the range control valve 115, the flow being through the port 314 and conduit 318 to the port 255. The upper end of the range control valve 115 is connected by means of the port 315 with the governor pressure supply conduit 241, and governor pressure is exerted on the upper end of the range control valve piston 312 moving it to the limit of its movement downwardly so that the ports 315 and 316 are connected. The governor pressure is thus applied through the conduit 319 and the port 298 on the upper end of the 1-2 shift valve 114. Prior to such movement, assuming that the valve 102 is put into D1 condition when the vehicle is stationary and the governor pressure is zero, the conduit 319, together with the upper end of the cavity in which the piston 290 is disposed, is drained through the ports 317 and 314 connected whenever line pressure is applied on the lower end of the range control valve piston 312 as in the D2 range. The spring 311 under these conditions moves the 1-2 shift valve piston 290 upwardly into its low speed position and thus assures that the valve piston 290 is in its low speed position when a start is made in the D1 range.

The 1-2 shift valve piston 290, when in its low speed position shifted to the limit of its movement upwardly, connects the ports 301 and 302 by means of the groove between the lands 293 and 294. The port 301 carries line pressure from the conduit 308 and port 249 of the manual valve 102, and line pressure is thus supplied to the conduit 330 connected with the port 302. Fluid pressure flows through the conduit 330 and its restriction 331, the rear servo apply regulator valve 109 and the conduit 332 to the servo motor 125 for engaging the rear brake 35 to complete the low speed forward drive power train.

The function of the 2-1 control valve is to provide at times an unrestricted connection between the conduit 330 and the front servo release cavity 123 of the servo motor 117 for the brake 34 and at other times to effectively connect the cavity 123 in series with the restriction 331 along with the rear servo 125, in the latter condition the cavity 123 and the servo 125 being connected in parallel both behind the restriction 331. The piston 333 of the 2-1 control valve is under the control of three forces: namely, that due to throttle pressure which is applied on the lower end of the piston 333, the force due to the spring 337, and a force due to fluid pressure from the branch conduit 344 applied between the lands 335 and 336 through the port 340. The land 335 is larger than the land 336, and the pressure in the conduit 344 thus tends to move the piston 333 to the limit of its motion downwardly.

As the fluid pressure in the conduit 330 and in the branch conduit 344 increases on the manual valve piston 242 being moved into its D1 position, the piston 333 of the 2-1 control valve 110 will move to the limit of its movement downwardly by reason of the pressure built up in the branch conduit 344 as long as there is no throttle pressure within the conduit 215. The 2-1 control valve is so arranged that whenever there is throttle pressure of any substantial value within the conduit 215, the piston 333 is moved thereby to the limit of its movement upwardly. Since, generally, in starting the vehicle, when the control valve piston 242 is moved to its D1 position, the accelerator 192 is released, the 2-1 control valve piston 333 may be assumed to move immediately to the limit of its movement downwardly, the pressure building up in the conduit 344 because the restriction 331 impedes the fluid flow to the rear servo 125. The 2-1 control valve piston 333 when it is moved to the limit of its movement upwardly effectively connects the conduit 363 connected with the front servo release cavity 123 in series behind the restriction 331 through the branch conduit 345, the port 339, the groove between the lands 334 and 335 and the port 342. On the other hand, when the piston 333 is at the limit of its movement downwardly, the restriction 331 is by-passed, and the conduit 363 connected with the front servo release cavity 123 is connected ahead of the restriction 331 through the branch conduit 344, the port 338, the groove between the lands 334 and 335 and the port 342.

The 2-1 control valve piston 333 functions under the three forces above-mentioned so that the piston is at the limit of its movement downwardly by-passing the restriction 331 whenever line pressure is supplied to the conduit 330 from the 1-2 shift valve 114 for completing the low speed drive, due to the pressure building up in the conduits 330 and 344, unless there is throttle pressure existing in the conduit 215. On the other hand, when the conduit 330 is bled to complete the second speed ratio as will be subsequently described, the 2-1 control valve piston 333 is under all conditions of throttle pressure at the limit of its movement upwardly in which the restriction is in series with the conduit 363 connected to the front servo release cavity 123. This is due to the fact that when the conduit 330 is bled, there is no pressure effective between the lands 335 and 336 overcoming the force due to the spring 337 either alone or augmented by force on the lower end of the piston 333 due to throttle pressure in the conduit 215.

The valve pistons 320 and 321 of the rear servo apply regulator valve 109 are initially at the limit of their movement downwardly under the action of the spring 324 thus fully opening the port 325 with respect to the port 328, and the initial flow of fluid pressure into the conduit 332 and to the servo motor 125 is unrestricted by the valve 109. As the pressure builds up in the conduit 332 and in the servo motor 125, the pistons 320 and 321 move upwardly assuming that the accelerator 192 is in closed throttle position, inasmuch as this fluid pressure on the servo motor 125 is applied through the port 329 on the lower end of the piston 320. When the pressure in the servo motor 125 reaches a predetermined low value, the piston 321 is moved upwardly sufficiently so that the land 322 closes the port 325 and prevents further fluid flow into the conduit 332 and servo motor 125. The valve 109 is responsive to changing position of the accelerator due to throttle pressure from the conduit 215 which is impressed on the upper end of the valve piston 321 through the port 326 augmenting the action of the spring 324 in tending to move the pistons 321 and 320 downwardly. When the accelerator 192 is moved to an open throttle position, the throttle pressure is sufficient so as to hold and maintain the pistons 320 and 321 at the limit of their movement downwardly to unrestrictedly connect the ports 325 and 328 regardless of build up of fluid pressure in the conduit 332 and servo motor 125; however, at closed throttle positions of the accelerator 192, the pressure in the conduit 332 and in the servo motor 125 for the rear brake 35 is regulated and maintained at a reduced value by the valve 109. As an example, if the line pressure is 80 pounds per square inch; at closed throttle, the rear servo apply regulator valve 109 regulates this pressure in a certain embodiment of the invention to 40 pounds per square inch in the conduit 332. The restriction 331 in restricting fluid flow and the rear servo apply regulator valve 109 with its regulating action function when the manual valve piston 242 is first put into its D1 position to provide a smooth and gradual engagement of the rear brake 35 for completing the low speed power train.

The fluid pressure in the conduit 330 provided when the manual valve piston 242 is first moved into its D1 position flows through branch conduit 344 and moves the piston 333 of the 2-1 control valve downwardly as above described. Fluid then flows from the branch conduit 344 through the port 338, the groove between the lands 334 and 335, the port 342 and the conduit 363 to the port 359 on the upper end of the front servo release control valve 111. This fluid pressure moves the front servo release control valve piston 356 downwardly to the limit of its movement to connect the ports 359 and 360, and the fluid from the port 359 flows into the port 360 and through the conduit 364 to the disapply cavity 123 of the servo motor 117 for the front brake 34. Fluid pressure is supplied to the apply cavity 122 of the servo motor 117 as previously explained from the port 249 of the manual valve 102, and this application of fluid pressure to the disapply cavity 123 disengages the brake 34 so as to break the intermediate speed drive and allow the low speed drive to be effective.

In D1 range, as the vehicle speed increases and the governor pressure in the conduit 241 and connected conduits increase; the increasing governor pressure, applied through the ports 315 and 316 of the range control valve 115, the conduit 319 and the port 298 on the upper end of the 1-2 shift valve 114, tends to move the 1-2 shift valve piston 290 from its low speed position in which it is illustrated to its intermediate speed position which is at the limit of its movement downwardly. The piston 290 moves from its low to its intermediate speed position against the action of the spring 311, and the "shift valve plug pressure" also opposes this movement of the 1-2 shift valve piston 290. As has been previously explained, the "shift valve plug pressure" is present in the ports 275 and 277 of the 2-3 shift valve 112, and the "shift valve plug pressure" is transmitted through the conduit 310, the port 305, the groove between the lands 291 and 292 of the piston 290 when it is in its low speed position, and the ports 297 and 296 to the lower end of the piston 290. When the governor pressure increases sufficiently to overcome the "shift valve plug pressure" and the force due to the spring 311, the 1-2 shift valve piston 290 moves to the limit of its movement downwardly into its intermediate speed position. In this position, the port 301 carrying line pressure is blocked; and the port 302, which in the low speed position of the 1-2 shift valve piston 290 has line pressure supplied to it, is drained to the sump through the bleed port 303 and the groove between the lands 293 and 294. The servo motor 125 for the rear brake 35 is drained through the conduit 332, the ports 328 and 325, the conduit 330, the restriction 331 and the port 302. The disapply cavity 123 of the front brake 34 is drained through the conduit 364, the ports 360 and 359, the conduit 363, the ports 342 and 339, the restriction 331, the conduit 330 and the port 302. Since the pressure in the conduits 330 and 344 is relieved for this ratio change, the 2-1 control valve piston 333 is at the limit of its movement upwardly so as to block the port 338 by the land 334 for this ratio change, so that fluid from the port 342 drains through the restriction 331.

Thus, on the 1-2 upshift, the fluid draining from the front servo release cavity 123 and also the fluid draining from the rear servo 125 flows through the restriction 331. The front servo release cavity 123 and the rear servo 125 are in effect connected in parallel behind the restriction 331; and between this restriction and the rear servo 125, the rear servo apply regulator valve is disposed. The front servo 117 during this shift functions as a pump discharging fluid through its conduit 364, and the rear servo 125 functions as an accumulator receiving this fluid, although the actual pressure of the fluid applied to the rear servo 125 is reduced by the valve 109, assuming that the accelerator is in a closed throttle position. The front servo 117 functions in this manner as a pump since line pressure remains applied within the apply cavity 122 of the front servo 117. The piston 118 of this servo is moved under such application of line pressure and discharges fluid into its conduit 364 faster than the fluid can flow through the restriction 331; and, therefore, this fluid flows through the branch conduit 345, the part of the conduit 330 between the restriction 331 and the valve 109, the rear servo regulator valve 109, and the conduit 332 to the rear servo 125 functioning as an accumulator. During this shift, it will be appreciated that the pumping effect by the front servo 117 and the accumulator effect by the rear servo 125 function to hold the rear brake 35 engaged longer than would otherwise be the case to give a greater overlap of engagement. The pressure of engagement for the rear brake 35 should, however, be lower to correspond with the decreased torque transmitted from the vehicle engine under relatively closed throttle conditions, and the rear servo apply regulator valve 109 functions for this purpose. If the 1–2 upshift is, however, made with a relatively wide open engine throttle, the rear servo apply regulator valve 109 under the action of the throttle pressure in the conduit 215 is out of action, that is, moved downwardly so as to unrestrictedly connect the ports 328 and 325; and thus, under these conditions, the full fluid pressure from the front servo 117 is applied to the rear servo 125, and the overlap of engagement by the brakes 34 and 35 is in effect shortened. In connection with this shift from first to second speed drive, it should be borne in mind that the low speed brake band 68 unwraps, that is, it is self-deenergizing for the direction of reaction for low speed drive from the drive shaft to the driven shaft. Therefore, the valve 109 reduces the pressure applied to the rear servo 125 to a less extent than if the band 68 were self-wrapping or self-energizing. It is this wrapping effect of the rear band 68 that must be reckoned with, particularly in making a 2–1 shift with released accelerator, which will be subsequently described. The principal purpose for the rear servo apply regulator valve 109 is, however, for the purpose of giving a smooth first to second speed shift, since the pressure of application on the rear servo 125 due to the accumulator effect of the front servo 117 would otherwise be too high under released accelerator conditions.

A subsequent upshift to high speed drive is obtained through the action of the 2–3 shift valve 112. This valve is subject to the governor pressure that increases with the speed of the vehicle, and this valve 112 is moved into its high speed position to complete the high speed drive by action of the increasing governor pressure in the same manner as in the D2 range.

A shift from direct drive to intermediate speed drive with the accelerator released and the vehicle speed decreasing or when the accelerator is moved to an open throttle kickdown position may be had in the D1 range in the same manner as in D2 range. A downshift from intermediate speed ratio to low speed ratio also takes place in the D1 range on decreasing vehicle speed and governor pressure. Assuming the transmission is in intermediate speed, when the governor pressure applied to the port 298 of the 1–2 shift valve 114 decreases sufficiently, the spring 311 will move the 1–2 shift valve piston upwardly into its low speed position. It should be noted that when the 1–2 shift valve piston 290 is in its intermediate speed position, its land 292 blocks the port 305 carrying "shift valve plug pressure," and hence the "shift valve plug pressure" is not effective to augment the action of the spring 311 in returning the 1–2 shift valve piston 290 into its low speed position. The piston 290 thus can be expected to shift at lower governor pressures from its intermediate speed position to its low speed position as compared to a movement in the opposite direction, thus eliminating hunting of the piston.

When the 1–2 shift valve piston 290 returns to its low speed position, line pressure is again admitted through port 301, the groove between the lands 293 and 294 and the port 302 to the conduit 330. This change of drive may be made either under closed throttle conditions or when the accelerator is in an open throttle position, but usually this shift occurs when the accelerator is relaxed. The pressure flows into the conduit 330 and branches off to both the front servo release cavity 123 and also to the rear servo 125. The 2–1 control valve piston 333 for a 2–1 shift is at the limit of its movement downwardly under closed throttle conditions. There is no throttle pressure in conduit 215 to oppose this movement under the action of the increasing pressure within the branch conduit 344 impressed on the land 335. If the engine throttle is open, on the other hand, throttle pressure in the conduits 215 and 354 is impressed on the lower end of the valve piston 333 and holds the piston at the limit of its movement upwardly. With relaxed throttle, with the piston 333 at the limit of movement downwardly, the 2–1 control valve 110 effectively connects the front servo release cavity 123 directly with the branch conduit 344, by-passing the restriction 331. The pressure from the branch conduit 344 flows to the front servo release cavity 123 through the port 338, the groove between the lands 334 and 335, the port 342, the conduit 363, the ports 359 and 360 and the conduit 364. Fluid from the conduit 330 flows to the rear servo 125 through the restriction 331, the valve 109 and the conduit 332. A rapid and unrestricted application of fluid pressure thus takes place to the disapply cavity 123 of the front servo 117, but the application of fluid pressure to the rear servo 125 is retarded and decreased by means of the restriction 331 and the rear servo apply regulator valve 109. It should be noted that the rear brake 35, under closed throttle conditions, when the driven shaft 26 tends to drive the vehicle engine 29, is wrapping or self-energizing, so that this 1–2 shift would be very abrupt and severe without a cushioning effect for the rear brake 35. The effect of the 2–1 control valve is to feed fluid pressure directly to the front servo disapply cavity 123 and to feed the rear servo 125 through the orifice 331, in addition to the regulator valve 109, so that the front brake 34 is immediately disengaged and the rear servo 125 is allowed to drift into engagement. It will be observed that, previously, for an upshift from first to second speed ratio, fluid pressure released from the front servo release cavity 123 and from the rear servo 125 have been co-ordinated through the single restriction 331 but for a downshift from second to first ratio, this co-ordination is overruled and the front servo 117 is made to act prior to the rear servo 125.

If a 2–1 downshift is made under open throttle conditions, the 2–1 control valve 333 is moved upwardly by the throttle pressure so as to again connect both the front servo release cavity 123 and the rear servo 125 in parallel with the restriction 331. Under these conditions, the vehicle engine 29 is driving so that the rear brake 35 when it engages does so with an unwrapping effect, and a smooth power train change can be obtained by permitting the pressure to build up simultaneously in the front servo release cavity 123 and on the rear servo 125.

With the transmission being in intermediate speed drive, the accelerator 192 may be moved to an open throttle kickdown position in order to obtain low speed drive. When the accelerator is in its kickdown position, line pressure is applied to the conduit 285 as previously described, and this line pressure is transmitted through the connected ports 276, the conduit 309 and the port 304 to the 1–2 shift valve 114 between the lands 292 and 293. Since the land 293 is larger than the land 292, the 1–2 shift valve piston 290 is moved upwardly, assuming that the vehicle speed and governor pressure are not too high. The 1–2 shift valve 290 in its low speed position will again admit line pressure into the conduit 330 through the port 302 for the purpose of applying the rear brake 35 and disapplying the front brake 34. The rear servo apply regulator valve and the 2–1 control valve in this case, however, will function under a relatively high throttle pressure. The throttle pressure in this case will hold the rear servo apply regulator valve piston 321 over to the limit of its movement downwardly regardless of increases in pressure in the conduit 332, and the throttle pressure will hold the 2–1 control valve piston 333 to the limit of its movement upwardly even when the pressure in the conduits 330 and 344 build up to full line pressure. Thus full line pressure is applied to the servo motor 125 for the rear break 35, and the cavity 123 of the servo motor 117 and the rear servo 125 are filled through the restriction 331 which cushions the functioning of the brakes 34 and 35. Thus, under these conditions, the engagement of the front brake 34 is relatively retarded to reduce the band overlap to correspond to the high torque conditions of the vehicle engine existing with the accelerator in an open throttle position.

When the manual valve piston 242 is moved into its "L" position, assuming that this is done while the vehicle is at rest, the lower speed power train through the transmission will be completed. The manual valve piston 242 in its "L" position connects the port 248 and 249 with the line pressure supply port 250 by means of the groove between the lands 243 and 244 and connects the port 252 with the line pressure supply port 251, the latter being connected along with the port 250 with the line pressure supply conduits 141 and 259. The line pressure supplied to the port 248 and the conduit 256 connected therewith supplies pressure to the front clutch 32 for engaging it and also supplies pressure to the governor valve 116 as previously described, and the line pressure supplied to the port 249 flows through the conduit 258 to the apply cavity 122 of the servo motor 117 for the front brake 34 as previously described. The line pressure supplied to the port 252 flows into the connected conduits 260 and 307, and the line pressure in the conduit 260 flows therethrough to the downshift valve 103 while the line pressure in the conduit 307 flows to the 1-2 shift valve 114. The fluid pressure within the conduit 260 flows through the port 191, the groove between the lands 187 and 188 of the downshift valve piston 186, the port 189 and the conduit 285 to one of the ports 276. It is assumed that when the manual control valve 242 is moved into its "L" position, the accelerator is in a closed throttle position so that the downshift valve piston connects the ports 191 and 189. The line pressure in the last-mentioned port 276 flows into the cavity for the piston 265, the plug 264 at this time being held at the limit of its movement downwardly by the spring 271, and this line pressure acts on the lower face of the land 267 and holds the pistons 265 and 266 of the 2-3 shift valve 112 at the limit of their movement upwardly in the downshifted position of the valve 112. This line pressure also flows into the lower port 276 and through the conduit 309 and the port 304 between the lands 292 and 293 and tends to move and hold the 1-2 shift valve piston 290 upwardly in its downshifted or low speed drive position, since the latter lands are unbalanced. The line pressure in the conduit 307 flows to the port 299 of the 1-2 shift valve 114 and is impressed on the lower face of the land 295 and provides an additional force on the 1-2 shift valve piston holding this piston in its low speed position. Since both of the shift valves 112 and 114 are in their downshifted positions, the transmission is in its low speed ratio, the connections to the clutches and brakes from the line pressure conduit 141 being as previously described.

If the manual valve piston 242 is moved into its "L" position from either its D2 or D1 position while the vehicle is travelling, the transmission will be shifted from its higher speed ratios to its low speed ratio and will then remain in its low speed drive. If the vehicle is travelling in its high speed ratio, the transmission will first downshift to intermediate speed ratio and then finally to low speed ratio and will remain in the latter ratio. The line pressure supplied to the port 276 of the 2-3 shift valve will act on the lower face of the land 267 and will move the 2-3 shift valve piston 265 to its downshifted position, assuming that the vehicle speed is not too high. The line pressure supplied to the port 304 of the 1-2 shift valve 114 will tend to move the shift valve 290 to its downshifted position and will do so when the vehicle speed drops sufficiently. The port 299 of the 1-2 shift valve 114 is blocked in the intermediate speed drive position of the piston 290; however, once the piston 290 moves into its low speed position, the port 299 is opened and applies line pressure on the lower face of the land 295 which holds the piston 290 in its low speed drive position regardless of any increases in vehicle speed.

Reverse drive in the transmission is made operative by moving the manual selector valve piston 242 into its "R" position. In this position the groove between the lands 244 and 245 connects the line pressure supply port 250 with the port 249 and the conduits 258 and 308. The conduit 258 is connected with the apply cavity 122 of the front brake 34; however, the front brake 34 remains disapplied as will now be explained. The line pressure supplied to the conduit 308 flows to the port 301 of the 1-2 shift valve 114, through the groove between the lands 293 and 294 of the 1-2 shift valve piston 290 and into the conduit 330. As has been previously explained, line pressure in the conduit 330 is transmitted to the servo motor 125 for the rear brake 35 through the rear servo apply regulator valve 109 so as to engage the rear brake 35, and the line pressure from the conduit 330 is transmitted through the 2-1 control valve 110 and the front servo release control valve 111 to the release cavity 123 of the servo motor 117 for the front brake 34, so that the front brake remains disengaged.

The manual selector valve piston 242 connects the line pressure supply port 251 with the ports 252 and 253. Pressure from the port 252, as has been described in connection with the drive in low range is transmitted through the downshift valve 103 and conduits 285 and 309 to the 2-3 shift valve 112 and the 1-2 shift valve 114 for holding these valves in their downshifted positions, and line pressure from the port 252 is also transmitted through the conduit 307 as previously described to the port 299 of the 1-2 shift valve for applying line pressure on the land 295 also tending to hold the shift valve 290 in its downshifted position. The line pressure supplied to the port 253 flows through the connected conduit 261 to the port 283 of the 2-3 shift valve and also to the port 214 of the throttle modulator valve 106. Since the 2-3 shift valve piston 265 is in its downshifted position, the line pressure flows from the port 283 through the groove between the lands 268 and 269, the port 279 and the conduit 287 to the rear clutch piston 65. The rear clutch is then engaged; and it, in conjunction with the rear band 35 which is also engaged, completes the reverse drive power train through the transmission.

The pressure from the conduit 261 to the port 214 of the throttle modulator valve 106 is applied on the left end of the modulator valve piston 203 and holds the valve to the limit of its movement to the right so that the groove between the lands 204 and 205 of this piston connects the ports 212, 213 and 210. The port 210 is connected with the throttle pressure supply conduit 215, and throttle pressure is thus supplied undiminished to the ports 212 and 213 and thereby respectively through the conduits 240 and 239 to the ports 231 and 230 of the compensator valve 105. The compensator valve 105 thus has a greater throttle pressure effect on it than for the forward drives, so that the compensator valve 105 reduces the compensator pressure in the compensator conduit 238 to a greater extent with opening of the engine throttle than is the case for the forward drives. The compensator pressure as has been previously mentioned is effective on the regulator valves 107 and 108, and the net result of the decreased compensator pressure is an increase in the line pressure in the conduit 141 regulated by the valve 107 and an increase in the converter pressure in the converter 31 regulated by the valve 108. The increased line pressure is necessary in reverse drive in order that the brake 35 may have sufficient holding ability to take the increased reaction on it for this drive.

As has been previously described, line pressure is supplied from the port 248 of the manual valve 102 through the conduits 257 and 288 and the port 282 between the lands 272 and 273 of the 2-3 shift valve piston 266. Since the land 273 is larger than the land 272, this line pressure acts to oppose governor pressure on the right end of the piston 266 which tends to move the 2–3 shift valve from its intermediate speed condition to its high speed condition. The purpose of applying this line pressure in this manner on the 2–3 shift valve is to prevent the shift from first to second speed drive and the shift from second to third speed drive occurring at too much the same governor pressure and vehicle speed as will now be described.

This compressing of the upshift points of the 1–2 valve 114 and the 2–3 valve 112, without this application of line pressure through the port 282, would occur due to the fact that the 1–2 valve 114 has a hysteresis effect tending to hold it in its downshifted position while the 2–3 valve 112 has a hysteresis effect tending to hold it in its upshifted position. The hysteresis effect on the 1–2 shift valve is due to the fact that the land 294 is slightly larger in diameter than the land 293. In one particular embodiment, the land 294 was .352 inch in diameter and the land 293 was .340 inch in diameter. Therefore, the line pressure that passes from the conduit 308 through the port 301, the groove between the lands 293 and 294 to the port 302 for low speed drive tends to hold the piston 290 in its low speed position due to the unbalanced land construction. This hysteresis effect is provided so that the valve piston 290 cannot upshift for the same governor pressure as it downshifts in order to avoid hunting movement. The hysteresis effect in the 2–3 shift valve piston 265 is provided by the lands 268 and 269. The land 268 is slightly larger in diameter than the land 269; in one particular embodiment, the land 268 was .437 inch in diameter and the land 269 was .394 inch in diameter. Therefore, the line pressure that flows from the port 247 of the manual valve 102 through the conduit 289, the port 284, the groove between the lands 268 and 269 to the port 279 for providing direct drive after the piston 265 has moved to its high speed position will tend to hold the piston 265 in its high speed position due to the unbalanced lands 268 and 269. This hysteresis effect is also for the purpose of preventing hunting movement of the 2–3 valve piston 265.

As has been previously explained, due to the functioning of the main regulator valve 107, the line pressure increases with increased throttle openings. Therefore, the effect of the line pressure on the 1–2 shift valve acting against the unbalanced lands 293 and 294 increases with increased throttle openings in holding the 1–2 shift valve 190 in its low speed position, and upshifts from first to second speed occur at higher vehicle speeds and governor pressure. There is no similar hysteresis area acting in the low speed position of the 2–3 shift valve 265, and hence, the upshift point for the 2–3 shift valve piston 265 does not increase in the same manner, and the 1–2 shift point tends to approach the 2–3 shift point.

The line pressure is, therefore, applied through the port 282 on the unbalanced lands 272 and 273 of the 2–3 shift valve piston 266 so as to act against the effect of the governor pressure on the upper end of the piston 266 and cause the 2–3 shift point to increase with respect to vehicle speed and governor pressure in the same manner as the 1–2 shift point increases. Thus, although the shift points do no remain fixed with respect to vehicle speed and governor pressure, nevertheless, they do remain spaced approximately the same due to the application of line pressure on the unbalanced lands 272 and 273 of the 2–3 shift valve, and this is satisfactory from an operating standpoint of the transmission controls.

The construction shown in FIGS. 3 and 4 may be utilized in lieu of the accelerator 192 directly acting on the downshift valve piston 186. As is apparent, the motor 400 acts through linkage on the downshift valve piston 186, and the accelerator 192 acts indirectly on the motor 400 by means of the vacuum that exists in the carburetor of the vehicle engine and in the manifold 438. The accelerator 192 through the intermediary of the motor 400 and the downshift valve 186 is effective to provide a throttle pressure in the conduit 215 which is substantially the same as the throttle pressure in the conduit 215 produced as hereinbefore described by the accelerator 192 acting directly through mechanical linkage on the downshift valve piston 186 and through the spring 201 on the throttle valve piston 193.

The two connected passages 450 and 448, together with their restricted orifices 451 and 449, cooperate to produce a vacuum in the passage 447 connected to the vacuum motor 400 that varies differently than the vacuum solely in the manifold 438. This modified vacuum pressure in the passage 447 is particularly suited for controlling the throttle valve 104 by means of the vacuum motor 400, so that the throttle pressure in the conduit 215 is substantially the same as that produced by the embodiment of the invention shown in FIGS. 2A to 2D, there being a minimum influence of changes in the speed of the engine 29 on the vacuum pressure in the passage 447.

In the fully closed engine idling position of the throttle plate 434 illustrated in full lines in FIG. 3, the vacuum sensed by both orifices 451 and 449 is the same, since the carburetor passage 436 is substantially closed in this position of the throttle plate, and this results in maximum manifold vacuum being applied to the diaphragm 403 of the vacuum motor 400 through the passage 447. The effect of the spring 417 on the diaphragm 403 and on the rod 416 is under these conditions fully overcome, so that the cup member 408 rests on the bottom of the housing portion 402. There is thus substantially no force transmitted through the link 420, the downshift valve piston 186 and the spring 201 to the throttle valve piston 193, and a substantially zero throttle pressure in the passage 215 results.

When the throttle plate 434 is opened to a partially opened position, for example, half-opened position, the position of the orifice 451 relative to the throttle plate 434 is now changed, the orifice 451 now being above the adjacent edge of the plate 434. The vacuum sensed at the orifice 451 is the result of airflow through the carburetor opening 436, and under the conditions of half-opened throttle, the quantity of airflow through the opening 436 is relatively low, and there exists a large differential between the vacuum pressures sensed by the two orifices 451 and 449. Under these conditions, the orifice 451 bleeds or reduces the higher vacuum produced at the orifice 449. Air flows through the passages 450 and 448 from the orifice 451 to the orifice 449, and the resultant modified pressure is applied to the diaphragm 403 of the vacuum motor 400 through the passage 447. It will be understood that when the vacuum in the passage 447 becomes greater, the diaphragm 403 together with the armature 406 and the rod 416 are moved to the right against the action of the spring 417. This motion allows the downshift valve piston 186 under the action of the spring 201 and the throttle pressure in the conduit 215 effective on the unbalanced lands 195 and 196 of the throttle valve piston 193 to move to the left. Conversely, when the vacuum in the passage 447 decreases, the spring 417 becomes more effective and moves the armature 406 and the rod 416 to the left. The lever 419 reverses the direction of movement and moves the downshift valve piston 186 to the right causing a greater throttle pressure to exist in the passage 215.

A kickdown may be obtained using the modification shown in FIGS. 3 and 4 in the same manner as in the first embodiment, namely, by moving the accelerator 192 to an open throttle position. During this movement of the accelerator 192, it is effective through the linkage 441 to move the throttle lever 439 to contact the stop pin 440, such contacting taking place just prior to the accelerator coming into contact with the stud 432 of the kickdown switch 425. Further movement of the accelerator 192 in this direction closes the switch 425 by moving the switch blade 430 to bridge the contacts 428 and 429. Closing of the switch 425 completes a circuit from the battery 427 and through the ignition switch 426 to the electric winding 410, energizing the winding. Such energization of the winding 410 holds the armature 406 to the limit of its movement into the winding 410 with the tapered core surfaces 415 and 414 in contact, and the rod 416 is given a corresponding movement to the left to the limit of its movement in this direction. This causes the downshift valve piston 186 to be moved to the right as seen in FIG. 3, so that the land 188 opens the port 190 with respect to the port 189, the same as when the accelerator is directly coupled with the downshift valve piston 186 and the accelerator is moved to its kickdown position. With the downshift valve piston 186 thus being in its downshifting position, a downshift is obtained in the same manner as in the first embodiment.

My improved transmission controls advantageously provide dual drive ranges, namely, the D2 drive range and the D1 drive range. In the D2 drive range, the vehicle starts in intermediate speed drive and subsequently, automatically shifts to high speed drive; while in the D1 range, increased acceleration may be obtained since the transmission starts the vehicle in low speed drive and automatically upshifts to second and high speed drives. The range control valve 115 advantageously functions in order to obtain this result, at times under the control of the manual selector valve 102 supplying line pressure to the 1–2 shift valve 114 for holding it in its upshifted position and at other times supplying governor pressure to this valve so that the valve upshifts under governor control.

The 2–1 control valve 110 advantageously functions to provide a smooth transition between low and intermediate speed drives, functioning to keep the restriction 331 in series with both the rear servo 125 and the disapply cavity 123 of the front servo 117 for all upshifts from low speed drive to second speed drive and putting the restriction 331 in series with only the servo 125 for 2–1 downshifts when the accelerator is at closed throttle position.

The front servo release control valve 111 advantageously functions so that the front servo release cavity 123 is under the control of either the 1–2 shift valve 114 or else the 2–3 shift valve 112.

Hysteresis areas are provided on both the 1–2 shift valve 114 and also on the 2–3 shift valve 112 which hysteresis areas are subject to the line pressure that increases with throttle opening, the hysteresis areas preventing hunting movement of both of the shift valves. Line pressure is also advantageously applied on the 2–3 shift valve piston 266 opposing the action of the governor pressure in order to avoid the compression of shift points of the shift valves with respect to vehicle speed that would otherwise occur.

I wish it to be understood that my invention is not to be limited to the specific constructions and arrangements shown and described, except only insofar as the claims may be so limited, as it will be understood by those skilled in the art that changes may be made without departing from the principles of the invention.

I claim:

1. In transmission mechanism, the combination of a drive shaft, a driven shaft, means for providing two different power trains between said shafts and including two friction engaging devices one for completing each of said power trains, a fluid pressure responsive piston acting in a chamber effective to engage one of said friction devices when fluid pressure is released from one side of the piston, a fluid pressure responsive piston acting in a chamber for engaging the other of said friction devices when fluid pressure is applied thereto, a conduit, said chambers being connected in parallel to said conduit, valve means in said conduit for applying and releasing fluid pressure on the pistons, means providing a restriction in said conduit, and valve means connected in parallel with said restriction means normally operable for providing a direct fluid pressure applying path to said first-named fluid pressure responsive piston and operable for providing an indirect fluid pressure path through said restriction to said fluid applying and releasing valve means when fluid pressure is released from the conduit to cause disengagement of one of said devices and engagement of the other device, the said first-named piston causes fluid to flow to said second-named piston for lengthening the period of engagement of the friction device controlled by said second-named piston for thereby smoothing the change of drive between said power trains.

2. In transmission mechanism, the combination of a drive shaft, a driven shaft, means providing a low speed power train between said shafts, means providing a high speed power train between said shafts, a friction engaging device for completing each of the said power trains, a first fluid pressure responsive piston operable in a chamber for causing engagement of the friction engaging device for the low speed power train when fluid pressure is applied thereto, a second fluid pressure operated piston operable in a chamber for said friction engaging device for said high speed power train for engaging the device when fluid pressure is applied thereto on an apply face of the piston, said last-named piston having a disapply face for causing disengagement of the friction engaging device for the high speed power train when fluid pressure is applied to the disapply face along with the apply face, means for applying a fluid pressure on the said apply face of said second-named piston for causing completion of said high speed power train, a conduit, said first piston chamber and said disapply face of said second piston chamber being connected in parallel to said conduit, valve means in said conduit for applying and disapplying pressure to said first piston and also to said disapply face of said second piston for thereby disengaging and engaging said high speed friction device and engaging and disengaging said low speed friction device for completing the low speed power train between said shafts, means providing a restriction in said conduit, and valve means connected in parallel with said restriction means and in series with said first and second piston co-acting with said restriction means to be normally operable for providing a direct fluid pressure applying path to said disapply face of said second piston and operable for providing an indirect fluid pressure path through said restriction means to said fluid applying and disapplying valve means when said applying and disapplying valve means is released to drain the conduit so that said second piston in moving to engage said high speed friction device when said conduit is drained pumps fluid through the conduit to said first piston chamber for prolonging the engagement of said low speed friction device and smoothing the change from the low speed power train to the high speed power train.

3. In transmission mechanism, the combination of a drive shaft, a driven shaft, means providing two different power trains between said shafts and including two friction devices one for each of the power trains engageable to complete the respective power train, a piston for engaging each of said friction devices, one of said pistons having an apply face operable in a chamber for causing application of the associated friction device when fluid pressure is applied thereto and having a disapply face operable in a chamber for disengaging the associated friction device when fluid pressure is applied to the disapply face with fluid pressure remaining applied to the said apply face, a source of fluid pressure, a conduit, said disapply face chamber of said one piston and the chamber of the other of said pistons being connected in parallel to said conduit, valve means in said conduit for connecting and disconnecting said pressure source and said disapply face of said one piston and the other of said pistons for disengaging one of said engaging devices and engaging the other of said engaging devices, means providing a restriction in said conduit and valve means connected in parallel with said restriction means normally operable for providing a direct fluid pressure applying path to said piston having an apply face and a disapply face and operable for providing an indirect fluid pressure path through said restriction means to said fluid connecting and disconnecting valve means when said connecting and disconnecting valve means is released for retarding the engagement of one of said friction devices and providing a smooth change in drive.

4. In transmission mechanism for an automotive vehicle, the combination of a drive shaft, a driven shaft, means for providing a low speed power train between said shafts and including a first friction engaging device for completing the train, means for providing a high speed power train between said shafts and including a second friction engaging device for completing the train, a first piston for applying said first friction device when fluid pressure is applied thereto, a second piston having an apply face for engaging said second friction device when fluid pressure is applied to said face and having a disapply face for disengaging said second friction engaging device when fluid pressure is supplied to said disapply face with pressure remaining applied on said apply face, a source of fluid pressure, means for connecting said pressure source and said apply face of said piston, conduit means for selectively connecting said pressure source and said first piston and said disapply face of said second piston for breaking said high power train and completing said low power train, an accelerator for the vehicles and a valve under the control of said accelerator for effectively placing a fluid restriction in series with said first piston when the accelerator is in a closed throttle position for retarding the engagement of said low speed friction device for smoothing the change of drive from said high speed power train to said low speed power train.

5. In transmission mechanism, the combination of a drive shaft, a driven shaft, means for providing two different power trains between said shafts each of which includes a friction engaging device for completing the respective power train, a fluid pressure actuated servo motor for each of said friction devices one of which engages the associated friction device when fluid pressure is applied thereto and the other of which disengages the associated friction engaging device when fluid pressure is applied to the latter servo motor, a source of fluid pressure, a conduit for connecting both of said servo motors with said pressure source and having a restriction therein for slowing the flow of fluid therethrough to said servo motors, and a valve for by-passing said restriction with respect to one of said servo motors and subject to the fluid pressure in said conduit on one side of said restriction for by-passing the restriction when the fluid pressure on said side of the restriction increases to a predetermined value.

6. In transmission mechanism, the combination of a drive shaft, a driven shaft, means for providing two different power trains between said shafts each of which include a friction engaging device for completing the respective power train, a fluid pressure operated servo motor for actuating each of said friction devices, one of said servo motors applying the associated friction device when fluid pressure is applied thereto and the other of said servo motors disapplying the associated friction engaging device when fluid pressure is applied to the latter servo motor, a source of fluid pressure, a conduit for connecting said pressure source with both of said servo motors for disengaging one of the servo motors and engaging the other, said conduit having a restriction therein for slowing the fluid flow through the conduit, and a valve subject to the fluid pressure in said conduit between said restriction and said pressure source for by-passing the restriction for one of said servo motors as the pressure in said conduit between said restriction and said pressure source builds up to a predetermined value.

7. In transmission mechanism for an automotive vehicle, the combination of a drive shaft, a driven shaft, means for providing two different power trains between said shafts each of which includes a friction engaging device for completing the respective power train, a fluid pressure actuated servo motor for each of said friction devices one of which is operated to disengage the associated friction device when fluid pressure is applied thereto and the other of which is operated to engage the associated friction device when fluid pressure is applied to the latter servo motor, an accelerator for the vehicle, a source of fluid pressure, a conduit for connecting said pressure source with both of said servo motors, said conduit including a restriction therein for retarding fluid flow therethrough to both of said servo motors, a valve for by-passing fluid flow to one of said servo motors around said restriction from said pressure source, and means under the control of the accelerator for holding said valve in a position rendering said restriction effective when the accelerator is in an open throttle position.

8. In transmission mechanism for an automotive vehicle, the combination of a drive shaft, a driven shaft, means providing two different power trains between said shafts each of which includes a friction engaging device for completing the respective power train, a fluid actuated servo motor for each of said friction devices one of which is adapted to engage the associated friction device when fluid pressure is applied thereto and the other of which is adapted to disengage the associated friction device when fluid pressure is applied thereto, an accelerator for the vehicle, a source of fluid pressure, a conduit for connecting said pressure source with both of said servo motors and having a restriction therein for restricting the fluid flow through the conduit, a valve for by-passing said restriction with respect to one of said servo motors and being subject to the fluid pressure in said conduit between said restriction and said pressure source so as to be held in its by-passing position when the fluid pressure in said conduit between said restriction and pressure source is above a predetermined value, and means interconnecting said accelerator and said valve for holding said valve in position blocking the by-pass of fluid around said restriction when the accelerator is in an open throttle position.

9. In transmission mechanism for an automotive vehicle, the combination of a drive shaft, a driven shaft, means providing a low speed power train between said shafts and including a friction brake for completing the power train when engaged and being self-deenergizing for a drive from said drive shaft to said driven shaft, means for providing a high speed power train between said shafts and including a friction engaging device for completing the power train when engaged, a first piston for engaging said brake when fluid pressure is applied thereto, a second piston having an apply face for engaging said friction engaging device when pressure is applied to said face and having a disapply face for disengaging said friction engaging device when fluid pressure is applied to said disapply face in addition to said apply face, a source of fluid pressure, means for connecting said pressure source and said apply face, a conduit for selectively connecting said disapply face and also said first piston with said pressure source, an accelerator for the vehicle, said conduit having a restriction therein for restricting flow of fluid to both said disapply face and also to said first-named piston, and a valve under the control of said accelerator for by-passing said restriction from said pressure source to said disapply face when the accelerator is in a closed throttle position and being ineffective to so by-pass the orifice when said accelerator is in an open throttle position.

10. In transmission mechanism for an automotive vehicle, the combination of a drive shaft, a driven shaft, means for providing a low speed power train between said shafts and including a friction brake which is self-deenergizing for drive from said drive shaft to said driven shaft, means for providing a high speed power train between said shafts and including a friction brake for completing the power train, a first piston for engaging said first-named brake when fluid pressure is applied to the piston, a second piston having an apply face for engaging said second-named brake when fluid pressure is applied to said apply face and having a disapply face for disengaging said second-named brake when pressure is applied to said disapply face in addition to said apply face, a source of fluid pressure, means for connecting said pressure source and said apply face, means including a conduit for selectively connecting said pressure source with said disapply face and also with said first piston, said conduit having a restriction therein for restricting fluid flow to said disapply face and also to said first piston, a control valve subject to the fluid pressure between said restriction and said pressure source which moves the valve into a position by-passing said restriction with respect to said disapply face, or accelerator for the vehicle and means connecting said accelerator and said valve so that said valve is moved in its position rendering said restriction effective regardless of whether said conduit is supplied with fluid pressure or is drained when the accelerator is in an open throttle position.

11. In transmission mechanism, the combination of a drive shaft, a driven shaft, means for providing two different power trains between said shafts and including a friction engaging device for each of said power trains, a first piston having an apply face to which fluid pressure may be applied for engaging the friction device and having a disapply face to which fluid pressure may be applied for disengaging the associated friction device with fluid pressure remaining applied on said apply face, a second piston for the other of said friction devices to which fluid pressure may be applied for engaging said other friction device, a source of fluid pressure, means connecting said pressure source and said apply face, means including a conduit for selectively connecting said pressure source with said disapply face and said second piston, said conduit including a fluid restriction between said pistons and said fluid pressure source so that when pressure is drained from said pistons through said conduit fluid flows from said first piston to said second piston for partially engaging the friction engaging device associated with said second piston, and a regulator valve between said two pistons for regulating to a lower value the pressure from said first piston applied to said second piston when said conduit is drained.

12. In transmission mechanism for an automotive vehicle, the combination of a drive shaft, a driven shaft, means providing a low speed power train between said shafts and including a friction brake for completing the power train, means for providing a high speed power train between said shafts and including a friction engaging device for completing the power train, a piston for said brake for applying the brake when fluid pressure is applied thereto, a piston having an apply face for applying said friction engaging device when fluid pressure is applied to said apply face and having a disapply face for disengaging said friction engaging device when fluid pressure is applied to said disapply face in addition to said apply face, a source of fluid pressure, means for connecting said pressure source with said apply face for applying said friction engaging device, means including a conduit for selectively connecting said pressure source and both said disapply face and said first-named piston or for draining said disapply face and said first-named piston, a restriction in said conduit between said pistons and said pressure source for causing fluid from said disapply face to be applied on said first-named piston when said conduit is drained for prolonging the engagement of said brake as said friction engaging device is being engaged for thereby smoothing the shift of power trains, an accelerator for the vehicle, and a regulator valve under the control of said accelerator for regulating the pressure applied to said first-named piston from said second-named piston to a reduced value when the accelerator is in a closed throttle position.

13. In transmission mechanism for an automotive vehicle, the combination of a drive shaft, a driven shaft, means for providing a low speed power train between said shafts and including a brake which is self-deenergizing for a drive from said drive shaft to said driven shaft, means for providing a high speed power train between said shafts and including a second brake, a first piston for applying said first brake when fluid pressure is applied to the piston, a second piston having an apply face for applying said second brake when fluid pressure is applied to said apply face and having a disapply face for disengaging said second brake when fluid pressure is applied to said disapply face in addition to said apply face, a source of fluid pressure, means for connecting said pressure source and said apply face, means for selectively connecting said disapply face and said first piston with said pressure source and including a conduit connected with both of said pistons, a restriction in said conduit between said pistons and said pressure source, said second piston from its disapply face directing fluid to said first piston for prolonging its engagement when fluid is drained from said conduit for causing a change from high speed power train to said low speed power train, an accelerator for the vehicle, a regulator valve for the fluid applied on said first piston and subject to the control of said accelerator for regulating the fluid applied on said first piston from said second piston to a reduced value, a control valve for at times shunting said restriction with respect to said disapply face, said control valve being subject to the fluid pressure in said conduit between said pressure source and said restriction and also being under the control of said accelerator so that it shunts said restriction when the fluid pressure in said conduit between said restriction and pressure source is above a predetermined value and when said accelerator is in a closed throttle position.

14. In transmission mechanism, the combination of a drive shaft, a driven shaft, means for providing a power train between said shafts and including a fluid pressure actuated engaging device, a source of fluid pressure, two shift valves each for connecting said pressure source with said engaging device, and a shuttle valve having opposite chambers respectively connected with the two shift valves so that pressure from the valves respectively moves the shuttle valve in one direction or the other to either of two positions in which it alternately connects said engaging device with one or the other of said shift valves.

15. In transmission mechanism, the combination of a drive shaft, a driven shaft, means for providing two different power trains between said shafts and including a fluid pressure actuated engaging device actuatable by fluid pressure for both of said power trains, two shift valves for connecting said pressure source with said engaging device and one of which completes one of said power trains and the other of which completes the other of said power trains, and a shuttle valve between said shift valves and said engaging device and having opposite chambers respectively connected with the two shift valves so that pressure from the valves respectively moves the shuttle valve in one direction or the other for connecting each of said shift valves with said engaging device when the respective shift valve is actuated to provide fluid pressure for said device and blocking said other shift valve with respect to said device.

16. In transmission mechanism, the combination of a drive shaft, a driven shaft, means for providing low and high speed power trains between said shafts and including a fluid pressure actuated engaging device actuatable by fluid pressure for both of said power trains, a source of fluid pressure, a shift valve for completing the low speed drive and connecting said pressure source and engaging device, a second valve for causing completion of said high speed power train and connecting said pressure source and engaging device, and a shuttle valve between said shift valves and said engaging device having opposite chambers respectively connected with the two shift valves so that pressure from the valves respectively moves the shuttle valve in one direction or the other to either of two positions for transmitting the fluid pressure from each of the shift valves to said engaging device while blocking the other of said shift valves from the fluid pressure from the shift valve supplying pressure to the engaging device.

17. In transmission mechanism, the combination of a drive shaft, a driven shaft, means for providing a low speed drive between said shafts and including a first friction engaging device for completing the drive, means for providing an intermediate speed drive between said shafts and including a second friction engaging device for completing the drive, means for providing a high speed drive between said shafts and including a third friction engaging device for completing the drive, first and second and third fluid pressure actuated pistons for respectively engaging said friction devices, said piston for said intermediate drive having an apply face and also a disapply face for disengaging said second device when fluid pressure is applied to said last-named face in addition to said apply face, a source of fluid pressure, a shift valve for selectively connecting said pressure source and said first piston and said disapply face on said second piston for controlling a shift from low to intermediate speed drive, a second shift valve for selectively connecting said pressure source with both said third piston and also with said disapply face on said second piston for controlling a change from intermediate to high speed drive, and a shuttle valve effectively between said shift valves and said disapply face of said second piston and having opposite chambers respectively connected with the two shift valves so that pressure from the valves respectively moves the shuttle valve in one direction or the other to either of two positions so as to connect each of the shift valves when it transmits fluid pressure with the disapply face and to block fluid flow from the shift valve transmitting the pressure to the other of said shift valves.

18. In transmission mechanism, the combination of a drive shaft, a driven shaft, means for providing a plurality of different drive trains between said shafts and including a plurality of fluid pressure actuated friction engaging devices, a source of fluid the pressure of which is variable, a pair of shift valves each of which has a low speed position and a high speed position and makes a change from a lower speed ratio power train to a higher speed ratio power train when shifted from its low speed position to its high speed position, each of said shift valves having a groove therein for transmitting fluid from said pressure source to one of said friction engaging devices with one of said shift valves being so effective for transmitting fluid pressure in its low speed position and the other of said shift valves being so effective for transmitting fluid pressure in its high speed position, the said groove in each of said shift valves being defined by lands of different size so that said fluid pressure tends to maintain the shift valve in its position in which it transmits fluid pressure through its groove, and a conduit for connecting said variable fluid pressure source with a face on one of said shift valves for yieldably holding said last-named shift valve in its low speed position.

19. In transmission mechanism for an automotive vehicle, the combination of a drive shaft, a driven shaft, means providing low and intermediate and high speed power trains between said shafts and including a plurality of fluid pressure actuated friction engaging devices for completing the power trains, an accelerator for the vehicle, a source of fluid under the control of said accelerator so that the pressure of the fluid is variable with accelerator position, a 1–2 shift valve for causing changes between the low and intermediate speed power trains and having a low and a high speed position, a 2–3 shift valve for causing changes between the intermediate and high speed power trains and having a low and a high speed position, a governor responsive to the speed of said driven shaft for providing a fluid pressure that is effective on each of said shift valves tending to shift it from its low speed position to its high speed position, said 1–2 shift valve having a groove and transmitting fluid pressure from said source to certain of said friction devices in its low speed position and said 2–3 shift valve having a groove transmitting fluid pressure from said source to certain of said friction devices in the high speed position of said latter shift valve, the said grooves in each of said shift valves being defined by lands of different size so that the fluid pressure flowing through the grooves tends to hold the 1–2 shift valve in its low speed position and tends to hold the 2–3 shift valve in its high speed position, and a conduit connecting said pressure source with a face of said 2–3 shift valve for opposing movement of said 2–3 shift valve from its low speed position to its high speed position.

20. In transmission mechanism for an automotive vehicle, the combination of a drive shaft, a driven shaft, means for providing a low speed power train between said shafts and including a first friction brake for completing the train, means for providing an intermediate speed power train between said shafts and inclding a second friction brake for completing the train, means for providing a high speed power train between said shafts and including a friction clutch for completing the train, a first piston for engaging said first brake when fluid pressure is applied to the piston, a second piston having an apply face for engaging said second brake when fluid pressure is applied to said apply face and having a disapply face for disengaging said second brake when fluid pressure is applied to said disapply face as well as to said apply face, a third piston for applying said friction clutch when fluid pressure is applied to said third piston, an accelerator for the vehicle, a source of fluid pressure under the control of said accelerator so that the fluid pressure increases as the accelerator is moved toward open throttle position, a 1–2 shift valve for causing changes between said low and intermediate speed power trains and having a low speed position and a high speed position and having a groove for connecting said pressure source with both said first piston and also said disapply face in its low speed position and blocking such application of fluid pressure in its high speed position, a 2–3 shift valve for causing changes between said intermediate and high speed power trains and having a low speed position and a high speed position and having a groove which connects said pressure source with said clutch piston and also with disapply face of said second piston in its high speed position and blocks such application of fluid pressure in its low speed position, means for connecting said pressure source with said apply face of said second piston so that said second brake is engaged when said 1–2 shift valve is in its high speed position and said 2–3 shift valve is in its low speed position, said grooves of said pistons being defined by lands of different diameter so that the flow of fluid pressure through said 1–2 shift valve tends to hold it in its low speed position and the flow of fluid pressure through said 2–3 shift valve tends to hold it in its high speed position, a governor resonsive to the speed of said driven shaft for applying a fluid pressure on said shift valves tending to move them from their low speed positions to their high speed positions, and a conduit for connecting said pressure source with a face of said 2–3 shift valve tending to oppose movement of said shift valve from its low speed position to its high speed position so that the shift point of said 2–3 valve with respect to driven shaft speed remains spaced approximately the same from the shift point of the 1–2 valve regardless of changes in the pressure of said source with movement of said accelerator.

21. A compound governor, comprising a governor body mounted for rotation about an axis and having a valve bore formed therein extending radially with respect to said axis, said governor body having inlet and outlet fluid pressure passageways communicating with said valve bore, a hollow governor valve reciprocably mounted within said valve bore and controlling said passageways, a governor weight extending through said hollow valve and projecting beyond the opposite ends thereof, the end of said governor weight projecting beyond the radially outer end of said valve being enlarged to form a mass of predetermined weight, a retainer mounted upon the end of said governor weight extending radially inwardly beyond said valve, a compression spring between said retainer and said valve, and means on said governor body projecting into the path of movement of said retainer to engage said retainer and arrest its movement relative to said governor body after a predetermined radially outward movement of said governor weight, said governor valve regulating fluid pressure supplied thereto from said inlet passageway in accordance with the rotational speed of said governor body about said axis with the initial regulation at relatively low rotational speed providing a relatively rapid pressure build-up in said outlet passageway as the centrifugal force of said governor weight is impressed upon said valve and providing a relatively slow pressure build-up in said outlet passageway at higher rotational speeds after said retainer has engaged the projecting means in said governor body and said governor weight is ineffective to apply its centrifugal force to said valve.

22. In a compound governor for a rotatable member, a governor body mounted for rotation with said member and having a stepped radially extending bore therein, said governor body having a line pressure port, a governor pressure port and an exhaust port all intersecting said bore, a governor valve adapted to control said ports and having a body portion reciprocable in the small diameter portion of said stepped bore and an enlarged head reciprocable in the relatively large portion of said stepped bore, said valve being hollow, and a governor weight having a shank extending through said hollow valve and an enlarged head of predetermined mass integrally formed with said shank and extending beyond the radially outer end of said stepped bore, said shank extending radially inwardly of the radial inner end of said valve, a retainer mounted upon the inwardly extending end of the shank of said weight, a compression spring encircling the shank of said weight between said retainer and the enlarged head of said valve, the stepped bore in said governor body having a shoulder formed therein adapted to be engaged by said retainer after a predetermined radially outward movement of said valve to prevent further radially outward movement of said governor weight to relieve said governor valve of the centrifugal force of said governor weight.

23. The structure defined by claim 22 which is further characterized in that said valve has an annular groove formed on the periphery of the body portion thereof to establish communication between said line pressure and said governor pressure ports and between said governor pressure and said exhaust ports to regulate the pressure in the governor pressure port in accordance with the rotational speed of said member, said regulation being in two phases, namely, an initial relatively low speed phase in which the centrifugal force of the governor weight is applied to the governor valve to cause the governor pressure to rise rapidly and a second relatively high speed phase in which the retainer carried by the governor weight engages the governor body to remove the effect of the centrifugal force of said governor weight from said governor valve to provide a less rapidly increasing governor pressure.

24. The structure defined by the preceding claim which is further characterized in that the line pressure port communicates with the small diameter portion of said stepped valve bore, said exhaust port communicates with the large diameter portion of said stepped valve bore, and said governor pressure port communicates with said stepped valve bore at the junction between said small and large diameter portions to apply said governor pressure to the differential area between said valve head and said valve body in a radially inward direction opposite to the radially outward centrifugal force of said governor valve and said governor weight.

25. A compound governor for a motor vehicle transmission having a rotatable shaft, comprising a governor body mounted for rotation with said shaft, said governor body having a valve bore formed therein and inlet and outlet fluid passageways communicating with said bore, said valve bore extending radially of said shaft, a valve slidably mounted in said bore and having differential areas exposed to the fluid pressure from said inlet passageway to exert a force upon such valve in a direction radially toward the axis of said shaft and opposite to the centrifugal force upon said valve resulting from the rotation of said shaft, a governor weight mounted for radial movement relative to said valve and to said governor body, said governor weight and said valve having concentrically related portions, and spring means between said valve and said governor weight for transferring the centrifugal force upon said weight to said valve, said governor weight having a portion engageable with a portion of said governor body after a predetermined radially outward movement to relieve said valve of the centrifugal force of said weight, said valve and said governor weight both being located wholly on the same side of the axis of said rotatable shaft so that the centrifugal force upon said valve and the centrifugal force on said weight are additive during low rotational speeds of said shaft prior to engagement of said governor weight with said governor body portion, said valve being hollow and said governor weight having a stem extending concentrically within said hollow valve, a radially inner end of said stem having a part engageable with a portion of said governor body to arrest radially outward movement of said governor weight.

References Cited in the file of this patent

UNITED STATES PATENTS

| | | |
|---|---|---|
| 2,697,363 | Sheppard | Dec. 21, 1954 |
| 2,726,557 | Ackerman | Dec. 13, 1955 |
| 2,740,304 | Sheppard | Apr. 3, 1956 |
| 2,766,639 | Rosenberger | Oct. 16, 1956 |
| 2,788,678 | Sheppard | Apr. 16, 1957 |
| 2,893,261 | Flinn | July 7, 1959 |

UNITED STATES PATENT OFFICE

CERTIFICATE OF CORRECTION

Patent No. 3,004,446                      October 17, 1961

George E. Flinn

It is hereby certified that error appears in the above numbered patent requiring correction and that the said Letters Patent should read as corrected below.

Column 38, line 74, beginning with "21. A compound governor," strike out all to and including "of said governor weight.", in column 40, line 52, comprising claims 21 through 25; in the heading to the printed specification, line 6, for "25 Claims" read -- 20 Claims --.

Signed and sealed this 17th day of April 1962.

(SEAL)
Attest:

ESTON G. JOHNSON

Attesting Officer

DAVID L. LADD

Commissioner of Patents